(12) United States Patent
Maruyama et al.

(10) Patent No.: US 7,646,564 B2
(45) Date of Patent: Jan. 12, 2010

(54) PERPENDICULAR MAGNETIC RECORDING HEAD FOR HIGH FREQUENCY DRIVE

(75) Inventors: Yoji Maruyama, Saitama (JP); Hideki Zaitsu, Kanagawa (JP); Ichiro Ohdake, Kanagawa (JP); Kazue Kudo, Kanagawa (JP); Masafumi Mochizuki, Tokyo (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 561 days.

(21) Appl. No.: 11/371,609

(22) Filed: Mar. 8, 2006

(65) Prior Publication Data

US 2006/0203384 A1    Sep. 14, 2006

(30) Foreign Application Priority Data

Mar. 9, 2005    (JP)    ............... 2005-064724

(51) Int. Cl.
*G11B 5/31*    (2006.01)
*G11B 5/39*    (2006.01)
*G11B 5/147*    (2006.01)

(52) U.S. Cl. ............... 360/125.07; 360/125.08; 360/125.11; 360/125.04

(58) Field of Classification Search ............ 360/125.04, 360/125.06–125.11
See application file for complete search history.

(56) References Cited

U.S. PATENT DOCUMENTS

| | | | |
|---|---|---|---|
| 4,656,546 A * | 4/1987 | Mallory | ............... 360/110 |
| 6,687,084 B2 | 2/2004 | Takahashi et al. | |
| 6,952,326 B2 * | 10/2005 | Hsu et al. | ............... 360/125.43 |
| 7,110,217 B2 * | 9/2006 | Lee et al. | ............... 360/125.42 |
| 7,324,304 B1 * | 1/2008 | Benakli et al. | ............... 360/125.33 |
| 2004/0047079 A1 * | 3/2004 | Ito et al. | ............... 360/317 |
| 2004/0051997 A1 | 3/2004 | Yazawa et al. | |
| 2004/0051999 A1 | 3/2004 | Yazawa et al. | |
| 2004/0070872 A1 * | 4/2004 | Hsu et al. | ............... 360/126 |
| 2004/0070876 A1 | 4/2004 | Yazawa | |
| 2004/0261254 A1 * | 12/2004 | Sasaki et al. | ............... 29/603.15 |
| 2005/0024774 A1 | 2/2005 | Fontana, Jr. et al. | |
| 2005/0068677 A1 * | 3/2005 | Shen et al. | ............... 360/126 |
| 2005/0141137 A1 * | 6/2005 | Okada et al. | ............... 360/122 |
| 2005/0180048 A1 * | 8/2005 | MacDonald et al. | ............... 360/125 |
| 2005/0219743 A1 * | 10/2005 | Guan et al. | ............... 360/125 |
| 2005/0237665 A1 * | 10/2005 | Guan et al. | ............... 360/125 |
| 2005/0243464 A1 * | 11/2005 | Lille | ............... 360/126 |
| 2006/0044681 A1 * | 3/2006 | Le et al. | ............... 360/126 |

FOREIGN PATENT DOCUMENTS

| | | | |
|---|---|---|---|
| EP | 411915 A2 * | 2/1991 | |
| JP | 07153023 A * | 6/1995 | |
| JP | 08221718 A * | 8/1996 | |
| JP | 2004-310968 | 11/2004 | |

* cited by examiner

*Primary Examiner*—William J Klimowicz
(74) *Attorney, Agent, or Firm*—Townsend and Townsend and Crew LLP; Rambod Nader

(57) ABSTRACT

Embodiments of the invention provide a perpendicular magnetic head with a narrow track and excellent high frequency characteristics. In one embodiment, a recording magnetic head includes coil conductors and magnetic pole pieces putting the same therebetween, in which a main magnetic pole piece is formed into a planar structure and a magnetic film connected with the main magnetic pole piece in a magnetic coupling relation is curved in the direction of the film thickness. Further, a shield material disposed near the main magnetic pole piece is made of a material of higher resistance than that of the material for the read shield.

4 Claims, 16 Drawing Sheets

US 7,646,564 B2

PERPENDICULAR MAGNETIC RECORDING HEAD FOR HIGH FREQUENCY DRIVE

This application claims priority from Japanese Patent Application No. JP2005-064724, filed Mar. 9, 2005, the entire disclosure of which is incorporated herein by reference.

BACKGROUND OF THE INVENTION

The present invention relates to a magnetic head for use in a perpendicular magnetic recording type magnetic disk drive and, in particular, it relates to a recording magnetic head structure suitable to recording of magnetic information on a medium surface at high frequencies, as well as a manufacturing method thereof.

Memory (recording) devices for information equipment mainly use semiconductor memories and magnetic memories. With a view point of access time, semiconductor memories are used for internal memory devices and, with a view point of large capacity and non-volatility, magnetic disk drives are used for external memory devices. The memory capacity is an important index for indicating the performance of the magnetic disk drive. In addition, large capacity and small-sized magnetic discs have been demanded in the market along with the development of the information society in recent years. The perpendicular recording system is suitable as a recording system for the demand. Since the system can increase the density, it is expected that the system will become predominant instead of the conventional longitudinal recording system.

Patent Document 1 (Japanese Patent Laid-open No. 2004-310968) discloses a perpendicular recording magnetic head comprising a main magnetic pole piece and a stabilized magnetized film having soft magnetic characteristics that is formed on the side of a track width direction of the main magnetic pole piece. Patent Document 2 (Japanese Patent Laid-open No. 2002-197615) discloses a perpendicular magnetic recording head comprising a main magnetic pole layer formed on a planarized insulative layer and a yoke layer with a large thickness, formed independently of the main magnetic pole layer, being stacked on the main magnetic pole layer.

BRIEF SUMMARY OF THE INVENTION

As a result of the study made by the inventors, it has been found the following subjects. The direction of magnetization in a recording medium of the perpendicular recording system is perpendicular to the medium surface. Therefore, the effect of demagnetizing fields acting between adjacent magnetic domains is small as compared with that in the longitudinal recording system, and magnetic information of high density can be recorded in the medium. It is thus possible to make a magnetic disk of large capacity. To match such a magnetic disk, it is necessary for the main magnetic pole piece defining the recording track width to have a narrow width at the air bearing surface and a thin film. That is, high accuracy is required for the pattern. Further, the magnetic pole piece must be spaced at a fixed distance from an auxiliary magnetic pole piece (soft magnetic film) for returning magnetic fluxes from the medium. Therefore, it is necessary to suppress exposure pattern irregularity due to evenness of the insulative film between the main and auxiliary magnetic pole pieces. In view of the above, as described in the patent document, the main magnetic pole piece is formed on the insulative film (planar surface) planarized by chemical-mechanical polishing (CMP), etc. Further, the main magnetic pole piece is connected at the rear end with a thick magnetic film. This is for inducing magnetic fluxes at high efficiency to the magnetic main pole piece formed of a thin film suitable to attainment of a narrow track width. Since this thick magnetic film is disposed on the upper or lower surface of the main magnetic pole piece, this provides a planar film constitution.

On the other hand, the perpendicular magnetic recording system capable of attaining the large capacity also requires high frequency recording characteristics. This is because the data transmission speed has to be increased in order to handle information with a large capacity and high density. This inevitably requires the recording operation at high frequencies. Meanwhile a perpendicular recording head was manufactured and evaluated which comprises a thin planar main magnetic pole piece and a thick magnetic film connected to the main magnetic pole piece at the rear end thereof in order to induce magnetic fluxes at high efficiencies. As a result, it was found that the head was not excellent in high-frequency characteristics. FIG. 26 shows the determination of the overwrite value (unit: dB) as an index of the recording performance for the recording frequency. It shows that the aimed normal recording operation cannot be attained at a high frequency of 600 MHz or higher. When the overwrite characteristic is less than −20 dB (approaching to 0), the former data cannot be erased completely, resulting in a possibility that the aimed magnetic information cannot be recorded precisely.

A feature of the present invention is to provide a magnetic head having excellent high-frequency characteristics and a narrow track width for attaining a magnetic disk drive that has high capacity and can record at high speed.

The outlines of typical inventions among those disclosed in the present application are to be described briefly as below.

In a magnetic head comprising a main magnetic head for defining a recording track width, an auxiliary magnetic pole piece, coil conductors, and a first magnetic film magnetically connected with the main magnetic pole piece, the first magnetic pole piece has a curved portion and the main magnetic pole piece is formed into a planarized surface. The curved portion of the first magnetic film can be formed by disposing a rounded insulative film between the film and the surface on which the main magnetic pole piece is formed.

In a magnetic head having a main magnetic pole piece, an auxiliary magnetic pole piece, first coil conductors and a first magnetic film exposed to the air bearing surface and connected with the main magnetic pole piece, the first magnetic film is disposed between the main magnetic pole piece and the auxiliary magnetic pole piece, the first magnetic film extends longitudinally in the direction of the depth from the main magnetic pole piece, the first magnetic film has a tapered surface from the air bearing surface, the tapered surface is formed so as to slant in the direction of the flying height as viewed from the air bearing surface, and the thickness of the first magnetic film on the side in the direction of the depth is formed larger than the thickness of the main magnetic film. The tapered surface can be formed by forming the first magnetic film on a slanted insulative film formed by using a lift-off method.

In a magnetic head comprising a reading portion, a main magnetic pole piece, an auxiliary magnetic pole piece, a second magnetic film exposed to an air bearing surface and surrounding the periphery of the main magnetic pole piece and coil conductors, a material of higher resistivity than that of the shield in the reading portion is used for the second magnetic film. The second magnetic film is formed of a material having a resistivity of 45 μΩ·cm or more.

According to the invention, it is possible to attain a magnetic head of excellent high frequency characteristics while ensuring a narrow track width. Further, a recording device of high capacity capable of high-speed writing can be attained by incorporating the magnetic head into a disk drive.

DETAILED DESCRIPTION OF THE INVENTION

Figure 2:
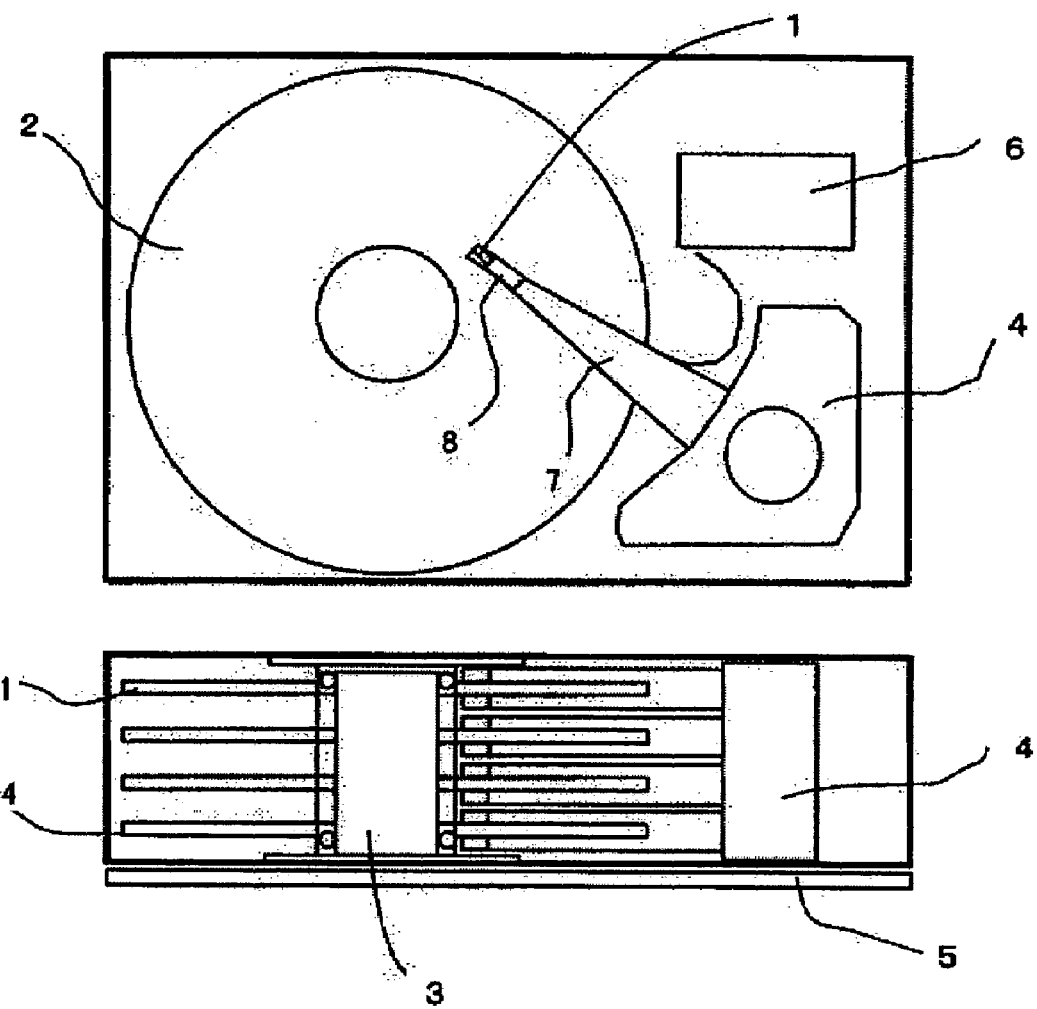
FIG. 2 is a simplified view of a magnetic disk drive using the magnetic head according to the invention.

FIG. 2 shows a basic constitution of a magnetic disk drive using a perpendicular recording system. A recording medium 2 (actually, a plurality of media 2-1 to 2-4 are present) is coupled directly to a motor 3 and has a function of rotation upon input/output of information. A magnetic head 1 is supported by a rotary actuator 4 by way of an arm 7. A suspension 8 has a function of holding the magnetic head 1 above the recording medium 2 with a predetermined force. Processing of read signals and input/output of information is performed by a signal processing circuit 5 and a recording/reading circuit 6, which are attached to an apparatus main body. The read waveforms obtained by the perpendicular magnetic recording system (change of amplitude of read signals relative to the time axis) are trapezoidal waveforms, which is different from Lorentz waveforms observed in the longitudinal recording system. Accordingly, the signal processing circuit and the waveform equalizing circuit are different from those of the longitudinal magnetic recording system.

The perpendicular magnetic recording system uses a medium having an axis of easy magnetization in the direction vertical to the recording surface. A glass or Al substrate is used for the recording medium of the magnetic disk drive. A thin magnetic film forming a recording layer is formed over the substrate. The recording magnetic field from the main magnetic pole piece is applied to the recording medium and reverses the magnetization of the recording layer. The perpendicular magnetic recording needs to use the vertical magnetic field component for recording; therefore, a soft under layer (SUL) is provided between the magnetic layer and the substrate.

To write magnetic information to the recording media, a functional portion having an electromagnetic conversion effect (write function portion) is used. Further, to read out magnetic information, a functional portion utilizing the magnetoresistive phenomenon or giant magnetoresistive phenomenon or electromagnetic induction phenomenon (read function portion) is used. The function portions are disposed at an input/output part referred to as a magnetic head. The magnetic head 1 is moved above the surface of the recording medium 2 along with the turning of the rotary actuator 4, is positioned at an optional location and then provides the function of writing or reading magnetic information. An electric circuit for controlling the same is present together with the signal processing circuit 5 described above.

Embodiment 1

Figure 1:
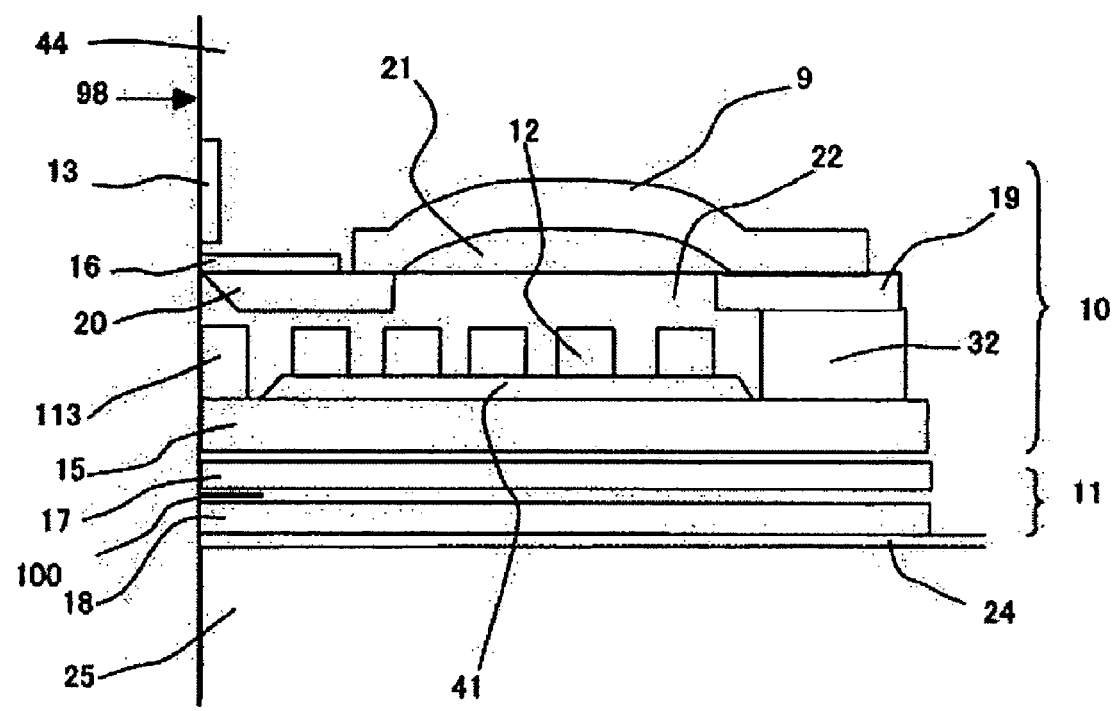
FIG. 1 is a simplified cross sectional view of a magnetic head according to a first embodiment.
Figure 3:
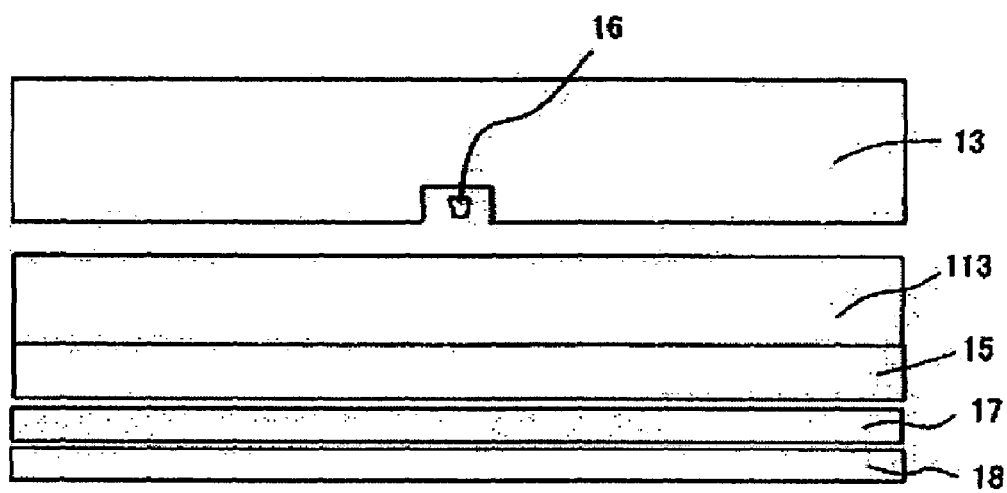
FIG. 3 is a view of a magnetic head of a first embodiment as viewed from the air bearing surface thereof.
Figure 4:
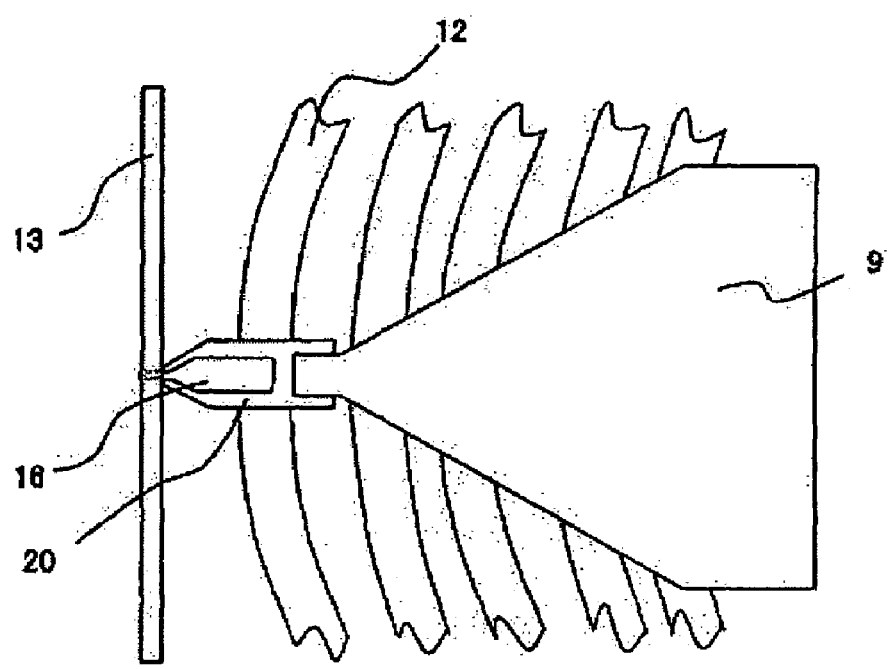
FIG. 4 is a view of a magnetic head according to the first embodiment as viewed from the trailing side of the magnetic head.

A description will be made of a structure of an information write function portion and an information read function portion mounted on the magnetic head 1. FIG. 1 is a cross sectional view of a device taken along a plane passing through the center of a main magnetic pole piece 16 and extending vertical to an air bearing surface 98. FIGS. 3 and 4 are views as viewed from the air bearing surface 98 and from the trailing side, respectively. FIG. 1 shows a structure in which a read function portion 11 and a write function portion 10 are stacked by way of a non-magnetic film over a substrate 25 of a slider.

The read function portion 11 comprises a lower shield 18, an upper shield 17 and, further, a magnetoresistive element 100 surrounded by the upper and lower shields and exposed in part to the air bearing surface. The magnetoresistive element 100 is connected to an electrode and has a function of transmitting electric information from the read function portion to the signal processing circuit. For the magnetoresistive element 100, a CPP (Current Perpendicular to Plane) device, a giant magnetoresistive element (GMR), or the like is used. The reading shields 17, 18 use permalloy comprising NiFe with 80% or more of Ni.

A slider member 25 as a substrate in the device manufacturing step is formed of $Al_2O_3$—TiC (carbide alumina titanate), over which an under layer 24 is stacked for insulation from the lower shield 18. The under layer 24 uses a nonmagnetic, insulative (or highly electrically resistant) material, e.g., $Al_2O_3$ (alumina).

The write function portion 10 basically comprises a magnetic layer that constitutes a magnetic pole piece for writing to a medium, a magnetic film 15 for returning magnetic fluxes from the medium and coils 12 disposed therebetween. The magnetic layer constituting the magnetic pole piece for writing to the medium basically comprises a main magnetic pole piece 16 that is exposed to the air bearing surface and defines the recording track width and a first magnetic film 9 magnetically connected with the main magnetic pole piece 16 and having a curved portion in the direction of the film thickness. Thus, the magnetic head having a thin planar main magnetic pole piece suitable to the perpendicular recording system can ensure high frequency characteristics.

Figure 27:
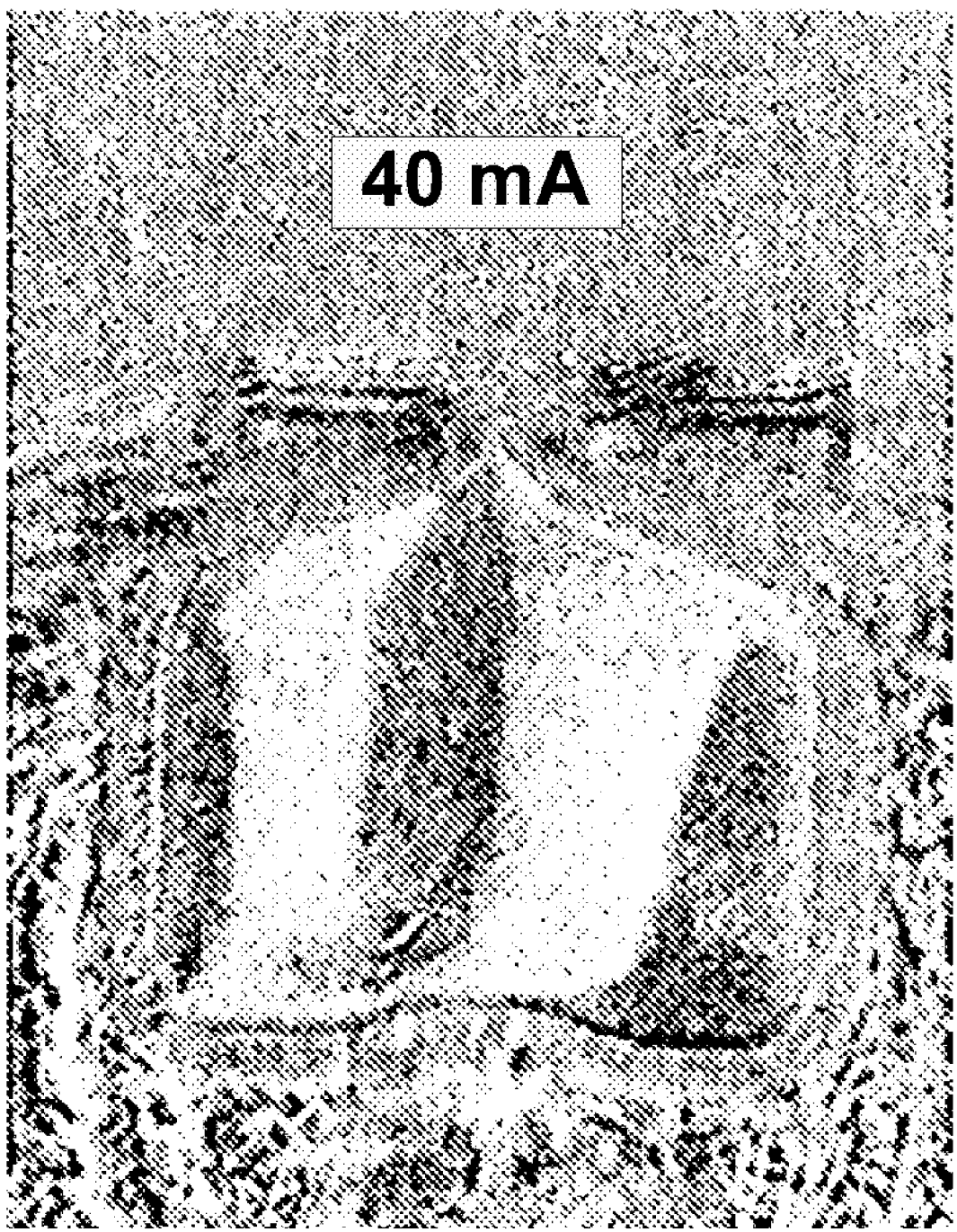
FIG. 27 shows the result of observation of magnetic domain images formed in the conventional perpendicular magnetic recording head.

The reasons for this will be described in detail. In a case where the first magnetic film of a relatively large thickness for inducing magnetic fluxes at high efficiency to a relatively thin main magnetic pole piece is planar, magnetic domains formed therein are arranged in the direction determined by the relationship between the direction of the anisotropic magnetic field and the shape anisotropy of the magnetic film. The first magnetic film in the perpendicular magnetic head is shaped to reduce its width on the side of the main magnetic pole piece in order to provide the function of narrowing the magnetic fluxes on the side of the main magnetic pole piece. Magnetic fluxes are generated when the magnetomotive force from the coils is applied to the first magnetic film. Modes allowing the magnetic fluxes to flow include a magnetization rotation mode and a magnetic wall moving mode. The magnetization rotation mode is predominant in a case of the domain arrangement parallel with the track width, whereas the magnetic wall moving mode is predominant in a case of the arrangement in the direction perpendicular to the track width (longitudinal direction). The magnetization rotation mode is suitable to high frequency driving. However, directions of the anisotropic magnetic fields generated from the first magnetic film are complicated. It is difficult to direct all of them in the direction of the arrangement of magnetic domains suitable to high frequency driving, that is, in the direction parallel with the track width. Therefore, it may be conceivable to adopt techniques of controlling the composition and film deposition condition of the soft magnetic film to direct the anisotropic magnetic fields of the film per se in parallel with the recording track width. However, the size of the magnetic film in the era where it is used for the perpendicular magnetic head is extremely small (about 16 µm wide, 12 µm long). Accordingly, the effect of the demagnetization field from the magnetic charges generated at the film edge is increased, making it impossible to increase the anisotropic magnetic field of the film per se within a range capable of obtaining aimed magnetic characteristics. For confirmation, magnetic domain images of a home base shape magnetic film with 2 µm thick, 12 µm long and 16 µm wide were observed through the Kerr effect and the results are shown in FIG. 27. The drawing is a photograph for magnetic domain images in which dark and light represent magnetic domains. It can be seen from the photograph that the magnetic domains run in the longitudinal direction (direction perpendicular to the track width). The arrangement cannot be said to be suitable to high frequency driving since magnetic walls tend to move in the right-to-left direction in the drawing upon sensing a magnetomotive force from the coils. To correct the magnetic domain arrangement, the film composition and the film forming conditions were changed variously and the same evaluation was repeated. However, it was not possible to obtain the aimed magnetic domain arrangement within a range capable of obtaining magnetic characteristics (saturation magnetization, coercive force, permeability) necessary for obtaining predetermined recording characteristics. Further, as a countermeasure using the shape effect, a countermeasure for enlarging the width of the core (using shape anisotropy) was also attempted. However, this resulted in a problem in that the resistance to the external leakage magnetic fields was deteriorated as the core width was increased. The problem is inherent to the perpendicular recording and caused because of the presence of an SUL layer on the lower surface of the recording medium. That is, when external leakage magnetic fields are applied to the recording device (magnetic head), they are absorbed in the core and flow from the core through the main magnetic pole piece to the SUL. If the flowing magnetic fluxes are large (if the magnetic fields from the main magnetic pole piece are strong), they erase the magnetic information. The ratio of the magnetic fields absorbed to the core depends on the shape. If the magnetic field is long in the lateral direction, resistance to the lateral magnetic fields is deteriorated. To obtain the resistance to the external magnetic fields for the components in all of the directions, it is preferred that the core is approximately in a square shape. That is, this means that the arrangement of the magnetic domains by using the shape effect is difficult.

Then, in the present embodiment, the first magnetic film 9 magnetically connected with the main magnetic pole piece is configured to be curved in the direction of the film thickness toward the main magnetic pole piece. As shown in FIG. 1, in a case where the magnetic film 9 is curved, magnetic charges are generated at the film surface when magnetic domains run along the curved shape, and the magnetic domains are arranged in the direction of the width undergoing the effect of the demagnetization fields from the magnetic charges to be in a constitution suitable to high frequencies. Since the connection portion tends to less function at high frequencies, it is desirable to form the curved surface at a portion other than the connection portion where magnetization rotation is caused.

The first magnetic film 9 has a shape protrudent at the central portion of the lower surface and is formed of Ni46 wt % Fe54 wt % with an electric resistance of 45 µΩ cm. The change of curvature and formation of the curved surface of the first magnetic film 9 can be attained by bringing the first magnetic film into contact with a non-magnetic body 21 and providing the curvature to the surface of the nonmagnetic body 21 in contact therewith. By constituting the nonmagnetic body 21 from a polymeric resin, a curved surface is obtained due to the thermal hydraulic property and highly viscous property of the polymeric resin. That is, the lower surfaces of both ends of the first magnetic film 9 are formed on the planarized plane for forming the main magnetic pole piece 16 and the polymeric resin layer 21 subjected to a heat treatment is disposed under the lower surface between the both ends, thereby forming the curved surface on the surface thereof. When a member having a difference of the film thickness more than that of the main magnetic pole piece is disposed at a central portion of the lower surface of the first magnetic film 9, a curved surface suitable to the high frequency operation can be ensured. By applying a heat treatment, etc. to the resist, a smooth curvature can be provided to the lower surface to facilitate the flow of the magnetic fluxes (decrease the magnetic resistance). A patterned resist before the heat treatment preferably has a size of about 5 μm in the direction of the depth and a film thickness of 200 nm or more.

By providing the curved surface on at least one side of the first magnetic film to be connected with the main magnetic pole piece, the magnetic domain arrangement formed therein can be made suitable to the high frequency operation.

The main magnetic pole piece 16 that defines the recording track width is exposed at least to the air bearing surface 98 of the magnetic head. While a thin protective film of several nm is formed on the air bearing surface, the surface excluding the protective film is defined as the air bearing surface in this specification. To attain a recording density on the order of 100 Gb/in$^2$, the width at the top end of the magnetic film 16 that determines the recording track width (width at the air bearing surface) is set to 0.2 μm or less.

The main magnetic pole piece uses a plurality of magnetic films formed from alloys comprising NiFe (nickel iron) with 70% or more of Ni, CoFe (cobalt iron) alloy, CoNiFe (cobalt nickel iron) alloy, or CoFe/NiFe, by a sputtering method. The main magnetic pole piece uses a material of a relatively high magnetic flux saturation density (Bs) of several tesla is used.

Further, the first magnetic film 9 and the second magnetic film 15 as an auxiliary magnetic pole piece in this embodiment each have a length of about 9 μm in the direction of depth. The thickness is set to about 2 μm. The width of the members undergoes restriction by the design of the slider air bearing surface that defines the flying height and a range from about 10 to 50 μm is suitable for a low flying height magnetic head used in high density recording. While the length in the direction of the depth is preferably as short as possible in view of the problem with the thermal deformation, it is suitably within a range from 5 to 20 μm in view of the necessity for surrounding the coils having a predetermined number of turns. While the effect of thermal deformation is smaller as the thickness is reduced, the ends tend to saturate magnetically more as the thickness is reduced, tending to erase the magnetic information just below. Further, since it becomes impossible for the magnetic fluxes to efficiently flow from the coils, the recording characteristics is deteriorated. It is suitably within a range from about 0.5 to 3.0 μm also allowing for the restriction of the width of the soft magnetic film pattern constituting the first magnetic film 9 and the second magnetic film 15. Both of them have a thickness larger than that of the magnetic film constituting the main magnetic pole piece. The width of the first magnetic film 9 progressively increases in the direction from the air bearing surface to the depth of the device. A maximum width of the first magnetic film (width on the side opposite to the air bearing surface) is about 12 μm. The width of the second magnetic film 15 is about 12 μm. A material of low linear expansion coefficient is suitable for the second magnetic film 15, which is made of Ni46 wt % Fe54 wt %.

The coils 12 are formed over the second magnetic film 15 by way of an under layer 41, composed of Cu (copper) and have a thickness of about 2.0 μm. A fluidic insulative material is formed on the lower periphery of the coil conductors. Further, the device portion is insulated magnetically and electrically with an alumina film 22 covering the entire coil conductors. The insulative underlayer 41 is formed of alumina, has a thickness of 0.2 μm and electrically insulates the coil conductors 12 from the second magnetic film 15.

In this embodiment, the main magnetic thin film 16 and the first magnetic thick film 9 having the curved portion are magnetically connected by way of a fourth magnetic film 20. Further, the main magnetic pole piece 16 is formed after the fourth magnetic film 20 is formed. This enables to accurately form the pattern of the main magnetic pole piece that defines the recording track width. To generate a magnetic field component vertical to the recording medium at high efficiency, a predetermined magnetic gap is formed between the main magnetic pole piece 16 and the second magnetic film 15. The predetermined gap is preferably from 1.5 to 2.0 μm. In view of the thickness of the fourth magnetic film that is necessary for inducing the magnetic fluxes efficiently, it is desirably of about 2 μm. In view of the above, the fourth magnetic film 20 of a large thickness to easily ensure the planarity of the plane to which the main magnetic pole piece is formed is used for magnetic coupling between the main magnetic pole piece 16 and the first magnetic film 9 having the curved portion.

Further, use of the fourth magnetic film 20 with no fine dimensional accuracy upon connection of the curved surface of the first magnetic film 9 and the smooth surface for the main magnetic pole piece on the same plane provides an advantage that in a case of forming a pattern for each of them, the damage to the pattern formed previously can be decreased. That is, in a case of forming on an identical curved surface with the first magnetic film, it can be joined with the main magnetic pole piece by applying an appropriate smoothing treatment. Further, in a case of forming on a smoothed surface identical with the main magnetic pole piece, damages given to the main magnetic pole piece in the subsequent step can be eliminated. The effect described above is remarkable in a case where the main magnetic pole piece 16 is formed after the formation of the fourth magnetic film 20 as shown in FIG. 1. Damages to the main magnetic pole piece 16 in the subsequent step is eliminated by connecting the main magnetic pole piece 16 at the end of the fourth soft magnetic film 20, then protecting the main magnetic pole piece 16 entirely (covering with a nonmagnetic material) and then connecting the first soft magnetic film 9 at the opposite end of the fourth magnetic film 20.

Figure 5:
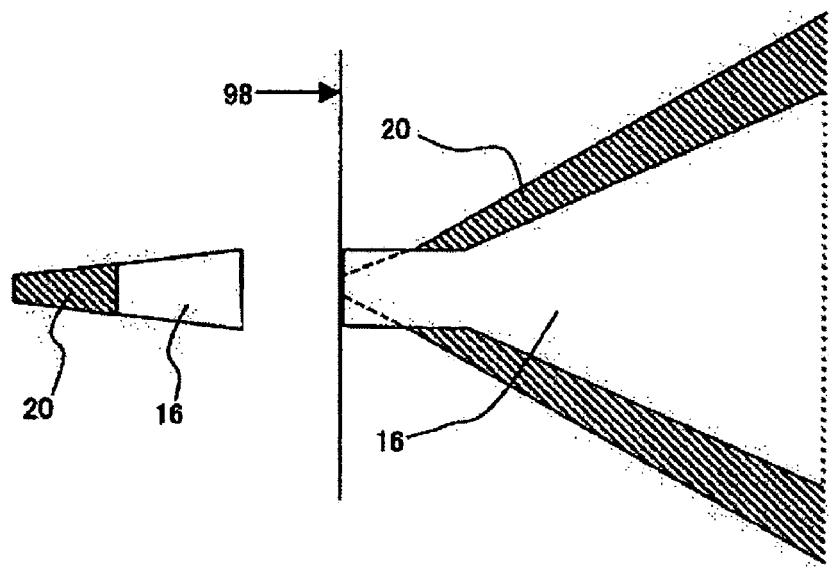
FIG. 5 is a simplified view showing a positional relation between a main magnetic pole piece and a fourth magnetic film of the first embodiment.

Further, in a constitution where the fourth magnetic film is disposed over the main magnetic pole piece, when the fourth magnetic film is formed after forming the main magnetic pole piece, a mechanism for protecting only the top end of the main magnetic pole piece with the non-magnetic material can be applied easily. This produces effects of reducing the number of steps and eliminating damages to the main magnetic pole piece upon formation of the first magnetic film 9. The fourth magnetic film 20 is connected below the main magnetic pole piece 16 and connected at the rear end thereof with the first magnetic film 9. FIG. 5 shows the relationship between the main magnetic pole piece 16 and the fourth magnetic film 20 therebelow as viewed from the air bearing surface (on the right), and in a widthwise corresponding manner as viewed from the trailing side (on the left). FIG. 5 shows, on the right, a positional relation between the main magnetic pole piece 16 and the fourth magnetic film provided therebelow in FIG. 4 in an enlarged scale. The film thickness of the fourth magnetic film 20 disposed between the first magnetic film 9 and the main magnetic pole piece 16 is decreased toward the air bearing surface 98 and provided with a tapered shape. The presence of the fourth magnetic film 20 can also provide another effect by exposing the soft magnetic film pattern at the air bearing surface 98. That is, it can provide a role of an auxiliary magnetic pole piece for generating strong magnetic fields (due to magnetic connection with the first magnetic film 9 for passing magnetic fluxes) and a role of controlling unnecessary magnetic fields in the direction of the track width (by providing a state of magnetic connection with the fourth magnetic film 13). In this constitution, the thickness of the fourth magnetic film 20 on the side in the direction of the depth is larger than the thickness of the main magnetic pole piece.

To emphasize the role as the auxiliary magnetic pole piece to enhance the magnetic field intensity, the fourth magnetic film 20 is exposed at the air bearing surface and the thickness of the fourth magnetic film 20 is decreased toward the air bearing surface 98 (reducing the cross sectional area toward the air bearing surface), thereby providing a function of concentrating the magnetic fluxes. That is, the fourth magnetic film 20 is provided with a tapered surface extending from the air bearing surface, and the tapered surface is formed such that it is inclined to the auxiliary magnetic pole piece in the direction of the flying height as viewed from the air bearing surface. This provides a function as an auxiliary pole because it is disposed below the main magnetic pole piece 16. By using a soft magnetic film with a magnetic flux saturation density (Bs) lower than that of the main magnetic pole piece for the fourth magnetic film 20, the magnetic field leaking from the portion can be decreased. Further, the shape at the air bearing surface shown on the left of FIG. 5 has such a constitution of sharing an inclined surface along the side wall of the main magnetic pole piece and not giving unnecessary magnetic fields to adjacent tracks in a state where the magnetic head has a skew angle on a recording medium. The fourth magnetic film 20 disposed between the first magnetic film 9 and the main magnetic pole piece 16 is exposed at the air bearing surface 98. The width of the exposed fourth magnetic film 20 is made equal with or less than the width of the main magnetic pole piece.

A sixth magnetic film 113 of a pedestal shape is formed at the top end of the second magnetic film 15. Magnetic fluxes in the soft magnetic film SUL in the medium used for the perpendicular magnetic recording system are returned to the soft magnetic film pattern of the magnetic head as the auxiliary magnetic pole piece for circulation. While the soft magnetic film pattern is designed to have a large width, magnetic charges are concentrated to the end thereof since the demagnetization fields are weakened. Then, in order to prevent erasing of the recorded information as the magnetic information by the concentration of the magnetic charges, a pedestal magnetic pole piece 113 is disposed at the second magnetic film on the side of the air bearing surface 98. The pedestal pattern 113 is constituted of Ni46 wt % Fe54 wt % like the second magnetic film. It has 2 µm thick (height), 30 µm wide and 1 µm long in the direction of the depth. As the thickness increases or the width is enlarged, the area of the pedestal pattern exposed at the air bearing surface can be increased, which is effective in decreasing the leakage magnetic fields (effect that the return magnetic fluxes are concentrated during recording). The length of the pedestal pattern 113 in the direction of the depth thereof depends on the amount of the heat deformation. In addition, it is more preferred that the length be shorter. However, in a case where the depth is less than about 1 µm (condition where it is significantly thinner than the film thickness of the soft magnetic film to be constituted), the pedestal pattern is magnetically saturated. Therefore, the width in the direction of the depth is set to 1 µm or more.

Then a description is to be made of another important constitution for obtaining good high frequency characteristics. As has been described already, the magnetic recording head has a possibility of attaining high-density recording. To obtain the feature, a fifth magnetic film 13 comprising a magnetic material and having a shield function is disposed adjacent to the main magnetic pole piece 16 to make the magnetic field gradient of the main magnetic pole piece 16 sharp on the trailing side (on the trailing end of the medium). The fifth magnetic film 13 is disposed near the main magnetic pole piece 16 via an insulative film. The fifth magnetic film 13 has a function of shunting the magnetic fluxes from the main magnetic pole piece thereby making the distribution of the magnetic fields from the main magnetic pole piece 16 sharper. It will be apparent from FIGS. 3 and 4 that it has a function of facing a medium surface at a wide area with an aim of allowing the shunt magnetic fluxes to flow efficiently to the magnetic medium. The width of the fifth magnetic film at the air bearing surface is almost the same as that of other shields (sixth magnetic film 113, reading shields 17, 18) and is larger than the width of the second magnetic film 9 at the rear end.

The length in the flowing direction of the magnetic fluxes of the fifth magnetic film 13 is substantially equal to the distance from the soft under-layer below the medium. This relation is set with an aim of not remarkably decreasing the magnetic fields from the main magnetic pole piece 16. In view of the function described above, it is necessary to allow high frequency magnetic fluxes to flow to the fifth magnetic film 13. However, in a case of using a soft magnetic film of low electric resistivity for the fifth magnetic film 13, a problem arises in that high frequency magnetic fluxes do not flow due to the effect of eddy current.

Then, in the present embodiment, the fifth magnetic film 13 is provided for shielding three sides of the main magnetic pole piece 16, that is, in the direction of the recording track width and on the trailing side of the main magnetic pole piece 16 in the region of the main magnetic pole piece 16 on the side of the air bearing surface. In this constitution, the fifth magnetic film 13 is constituted, particularly, of a material of a resistance of as high as 45 µΩ·cm. The material of high resistivity has an effect of generating less eddy current and suppressing the degradation of magnetic characteristics even under a high frequency circumstance.

The high frequency characteristics can be improved by merely increasing the electric resistance within a range not deteriorating the magnetic characteristics. Constitution of the fifth magnetic film 13 with a stacked structure of an insulative material and a magnetic material is one of the mechanisms therefor. Further, it is another technique to constitute the fifth magnetic film 13 with a stacked structure of a soft magnetic material of high resistance and a soft magnetic material of low resistance. That is, generation of eddy current can be decreased in view of electrical property without deteriorating the magnetic characteristics by setting the insulative layer to an appropriate thickness (extremely thin film). Further, in the structure of stacking a soft magnetic material with low resistance by way of a magnetic material with high resistance instead of the insulative layer, the material of high resistance generates less eddy current. In addition, due to the effect, the total amount of the eddy current in the fifth magnetic film can be decreased to suppress the degradation of magnetic characteristics at high frequency.

FIGS. 3 and 4 specifically show the constitution of the magnetic film 13. FIG. 3 is a view as viewed from the air bearing surface and FIG. 4 is a view of a device-formed surface as viewed from above. In this embodiment, the fifth magnetic film 13 measures 30 µm wide (length in the direction parallel with the recording track width), 5 µm high and 150 nm long in the direction of the depth. The material is formed of 46NiFe alloy with a specific resistivity of 45 µΩ cm. The length relative to the air bearing surface is about 50 to 150 nm. In a structure having a thickness of 150 nm or more in the direction of the depth, leakage of magnetic fluxes increases to decrease the magnetic fields from the main magnetic pole piece. On the other hand, in a thinner structure of 50 nm or less, the magnetic function as the shield is deteriorated.

In this embodiment, the fifth magnetic film 13 and the sixth magnetic film 113 that are exposed to the air bearing surface and form a shield for surrounding the main magnetic pole piece are formed of a material having a higher resistivity than that of reading shields 17 and 18. This is because it has been found that the function is deteriorated under the high frequency circumstance in a case of using permalloy with a relatively high permeability which is usually used, for example, in the reading shield or the like as a trailing shield. While sinusoidal waves are used in the reading system, rectangular waves are used in the recording system. Processing for harmonic waves as high as several times (three to five times) thereof is also necessary. Therefore, for high frequencies, the magnetic film used for the recording system needs to use a material of high resistivity, in which eddy current loss is reduced.

In view of the above, to attain an aimed high density recording under the high frequency circumstance, the sixth magnetic film 113 and the fifth magnetic film 13 are formed of a material with a resistivity of 45 $\mu\Omega$ cm or more. Specifically, Ni46 wt % Fe54 wt % is used. It has been confirmed that favorable characteristics are provided also by materials showing the electric resistance of about 45 $\mu\Omega$ cm in addition to Ni46 wt % Fe54 wt % shown in the embodiment. For example, aimed high frequency driving characteristics are obtained also by constituting the fifth magnetic film 13, for example, with a structured film formed by successively stacking (multi-layering) an alumina film of 10 nm thick and a soft magnetic film of 0.1 nm thick or with a structured film formed by successively stacking (multi-layering) an Ni46 wt % Fe54 wt % film of 50 nm thick and a soft magnetic film of 0.1 nm thick. In any of the examples, it is a basic constituent factor for achieving the present invention that the electric resistance $\rho$ of the sixth magnetic film 113 and the fifth magnetic film 13 is made higher than the electric resistance of the reading shield.

Figure 6:
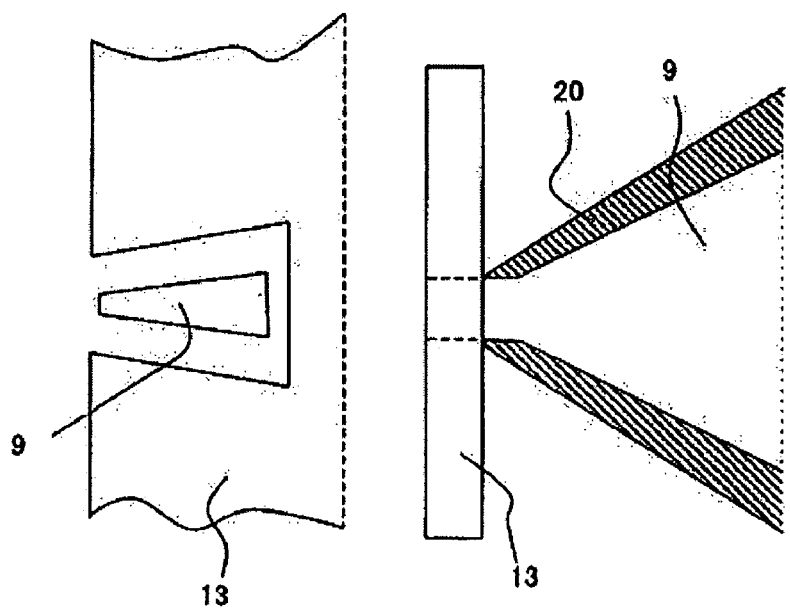
FIG. 6 is a first simplified view showing the positional relation of a trailing shield.

As has been described already, with an aim of making the gradient of the magnetic fields sharp on the trailing side of the main magnetic pole piece 16, it is necessary to bring it closer to an appropriate distance relative to the fifth magnetic film 13. FIG. 6 shows a main part in FIG. 4 in an enlarged scale. FIG. 6 shows the relationship among the main magnetic pole piece 16, the fourth magnetic film 20 therebelow and the trailing shield 13 as viewed from the air bearing surface (on the right) and in a widthwise corresponding manner as viewed from the trailing side (on the left). As apparent from the view as viewed from the air bearing surface, an oblique gap is formed in the fifth magnetic film 13 along the reversed trapezoidal edge of the main magnetic pole piece 16, and it is disposed in a magnetically closer state with the main magnetic pole piece on the air bearing side. In this embodiment, the range of the gap (distance between the main magnetic pole piece edge and the fifth magnetic film edge) is set from 40 nm to around 200 nm.

Figure 7:
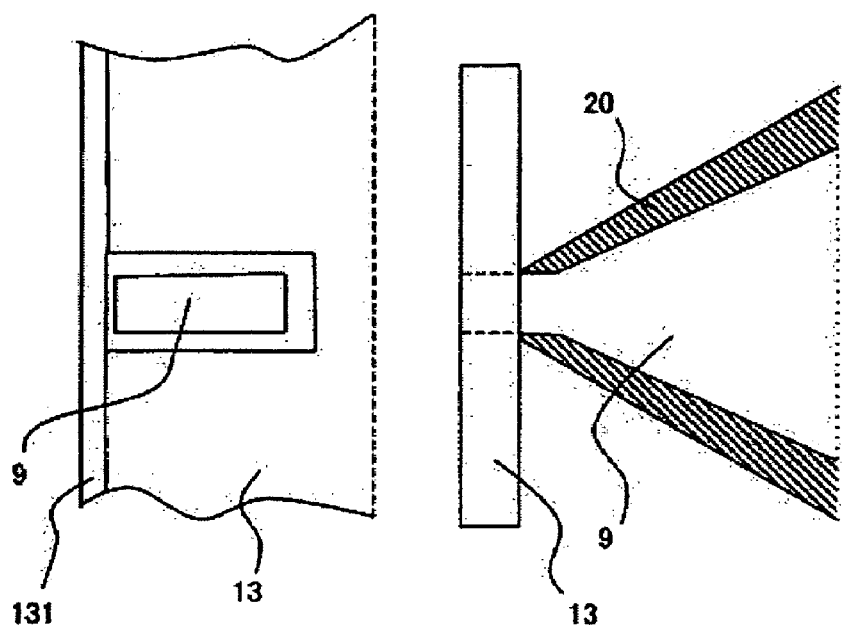
FIG. 7 is a second simplified view showing the positional relation of the trailing shield.

FIG. 7 shows the relationship among the main magnetic pole piece 15, the fourth magnetic film 20 therebelow and the trailing shield 13 as viewed from the air bearing surface (on the right) and in a widthwise corresponding manner as viewed from the trailing side (on the left). As shown in an enlarged view of the main magnetic pole piece on the left of FIG. 7 as viewed from the air bearing surface 98, an additional magnetic film 131 may be inserted to a lower position of the main magnetic pole piece 16 (leading edge) for the close relation with the fourth magnetic film 20. This is because high frequency characteristics can be ensured. In this embodiment, it is possible particularly to allow magnetic fluxes to escape at high efficiency from the lower position of the main magnetic pole piece 16 to the soft magnetic film 131, decreasing the magnetic fields generated from the lower portion of the main magnetic pole piece. Due to the effect, leakage magnetic fields causing troubles in the recording operation on the side of the trailing edge are not generated without intentionally forming the reversed trapezoidal shape to the main magnetic pole piece. The constitution of not requiring the reversed trapezoidal shape is suitable particularly to the recording head with super-high density since fine dimensional fabrication is enabled.

Further, as shown in the right part of FIG. 7 that illustrates the device as viewed from the trailing side, by magnetically connecting the end face of the fourth soft magnetic film 20 with the soft magnetic film 131 constituting the lower surface of the fifth magnetic film 13, necessary magnetic fields from the lower surface of the main magnetic pole piece can be introduced to the fifth magnetic film 13 and can be induced to the medium surface. By particularly emphasizing the effect, a sharp gradient of magnetic fields can be formed only on the trailing side.

Due to the effect, the shape of the main magnetic pole piece 9 can be formed in an approximately rectangular shape without particularly adopting the reversed trapezoidal shape. This effect can improve the accuracy in forming the main magnetic pole piece. The shape of the main magnetic pole piece not requiring the reversed trapezoidal shape is effective for the improvement of the accuracy of a narrow track width in the future, providing an effect of remarkably decreasing the production cost.

While the high frequency characteristics can also be improved even by the mere constitution having the fifth soft magnetic film 13 with high resistance, the high frequency characteristics can be improved further by combination with the constitution of bending the first magnetic film in the direction of the film thickness.

The first magnetic film 9 and the second magnetic film 15 are magnetically connected at the rear end position by third magnetic films 19 and 32. Since the magnetic film 19 can be formed in the step of forming the fourth magnetic film 20, the connection at the rear end portion can be formed with a one magnetic film although it is formed with plural magnetic films 19 and 32. Further, conduction at the rear end can be saved in the perpendicular magnetic recording system in which writing is conducted with smaller magnetic fluxes compared with the in-plane magnetic recording system. The recording portion is provided with a function capable of effectively generating magnetic fields in the direction vertical to the medium surface by constituting at least with the main magnetic pole piece that is magnetically connected with the first magnetic film 9 and defines the recording track width, and arranging the second magnetic film 15 and the main magnetic pole piece 16 at an appropriate magnetic distance.

It is desirable to stack a thin non-magnetic film between the second magnetic film 15 as a return pole and the upper shield with an aim of not giving the effect of the recording magnetic field to the side of the read function portion. However, one magnetic layer may be shared by the second magnetic film that constitutes the auxiliary magnetic pole piece and the upper shield 17 for simplifying the manufacturing steps.

The structure of a write function portion is formed after formation of the read function portion including the shields 17 and 18 for reading information. A protective film 44 formed of alumina is provided above the main magnetic pole piece 16. The device portion can be protected against corrosion or the like by surrounding all the device structure with the protective film 44 formed of alumina or the like.

Main constitutions of the embodiments described above are summarized as below.

Figure 28:
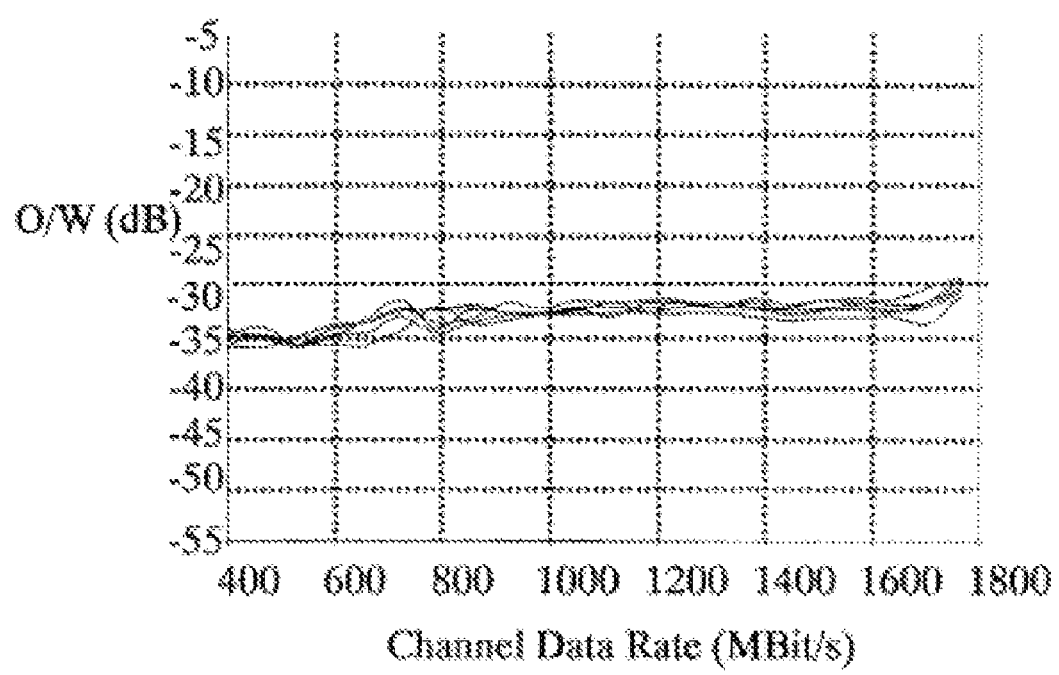
FIG. 28 shows frequency characteristics in a case of applying the structure of the invention.

The main magnetic pole piece is constituted on a plane subjected to a planarizing treatment and a magnetic film (first magnetic film 9) magnetically connected with the main magnetic pole piece for inducing the magnetic fluxes to the main magnetic pole piece is curved in the direction of the film thickness. By providing the curvature with the first magnetic film 9, it is possible to arrange magnetic domains formed therein in the direction parallel with the track width and satisfactory recording operation can be attained also under high frequency driving condition. FIG. 28 shows overwrite characteristics (O/W) [dB] relative to the data transfer rate (channel data rate) [Mbit/s]. It shows that the writing characteristics are not deteriorated even when the channel data rate increases, that is, it shows excellent high frequency characteristics. For example, the channel data rate 1200 Mbit/s corresponds to about 600 MHz of high frequency. This ensures the writing characteristics even at a frequency of 600 MHz.

The high frequency characteristics can be ensured by forming the magnetic film (fifth magnetic film 13) at the periphery of the main magnetic pole piece with a material of higher resistivity than that for the reading system shields (shields 17, 18). A tapered surface is formed on the magnetic film (fourth magnetic film 20) disposed between the main magnetic pole piece and the auxiliary magnetic pole piece and connected with the main magnetic pole piece. In addition, the tapered surface is formed such that it is slanted toward the side of the auxiliary magnetic pole piece in the direction of the flying height as viewed from the air bearing surface. Therefore, the magnetic film can be provided with a function as the auxiliary pole for the main magnetic pole piece. Further, by using this magnetic film (fourth magnetic film 20) for connecting the main magnetic pole piece and the curved magnetic film (first magnetic film 9), the main magnetic pole piece of a narrow track width can be formed with high accuracy.

Embodiment 2

Embodiment 2 is a modified example of a structure in which the fourth magnetic film 20 in Embodiment 1 is not exposed to the air bearing surface.

Figure 8:
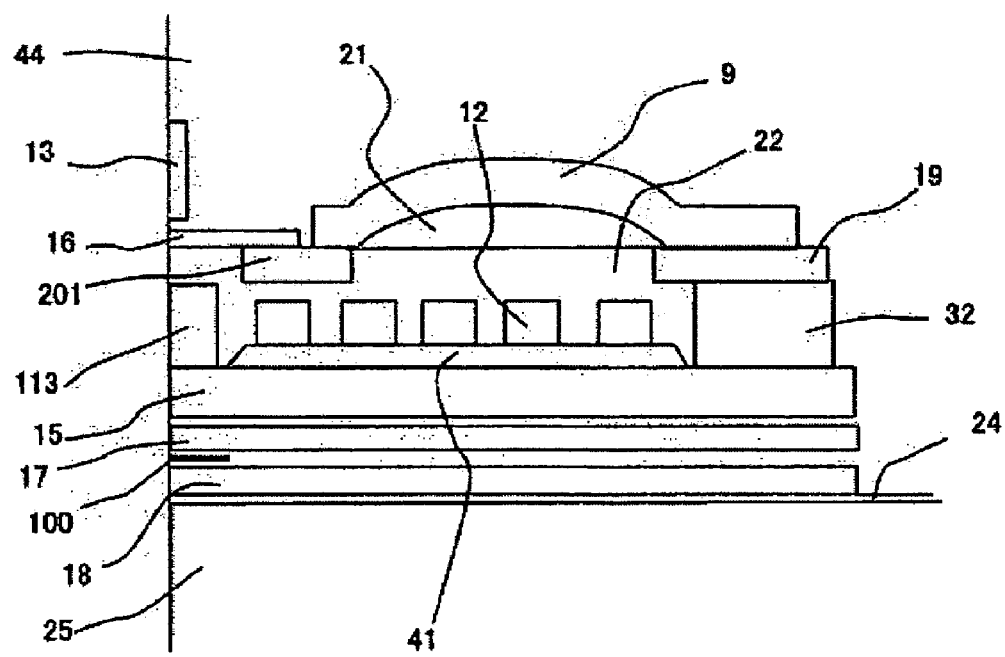
FIG. 8 is a simplified cross sectional view for a magnetic head according to a second embodiment.
Figure 9:
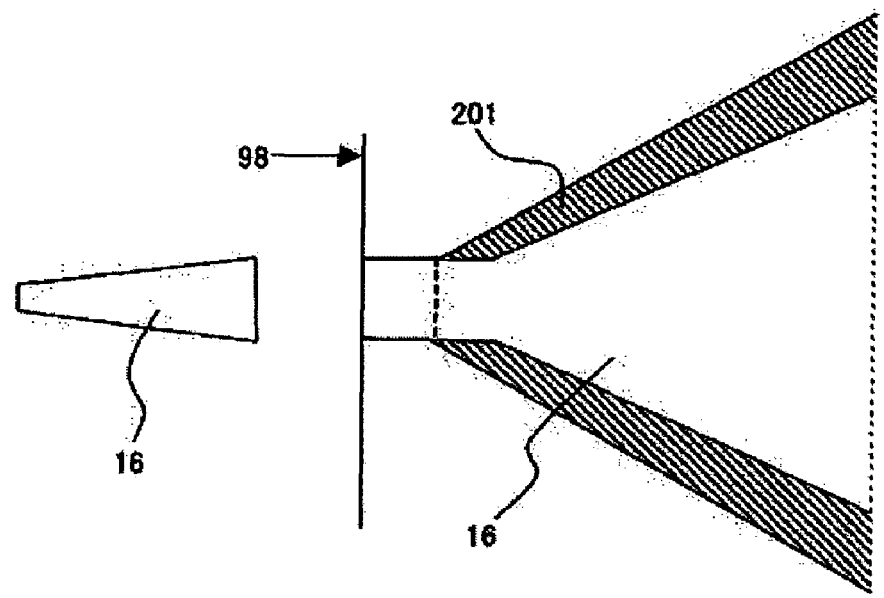
FIG. 9 is a simplified view showing a positional relation between a main magnetic pole piece and a fourth magnetic film of a second embodiment.

FIG. 8 is a cross sectional view illustrating the constitution in which a fourth magnetic film 201 is spaced from the air bearing surface. FIG. 9 illustrates a positional relationship between a main magnetic pole piece 16 and a fourth magnetic film 201 adapted to magnetically connect a curved first magnetic film 9 and the main magnetic pole piece 16, the left figure being as viewed from the air bearing surface side and the right figure being as viewed from the trailing side. Additionally, FIG. 9 shows a relationship between the main magnetic pole piece 16 and the fourth magnetic film 201 therebelow in the widthwise-corresponding manner as viewed from the air bearing surface (on the right) and as viewed from the trailing side (on the left). While the function of the fourth magnetic film 201 has been described in Embodiment 1, a constitution of not extending the soft magnetic film pattern 201 to the air bearing surface 98 as shown in FIG. 9 is also effective in view of the simplification of manufacturing steps. In this embodiment, while the fourth magnetic film 201 is not shown as viewed from the air bearing surface 98, it overlaps with the main magnetic pole piece 16. This embodiment has the same advantage in view of device formation as that of the embodiment described previously.

Figure 10:
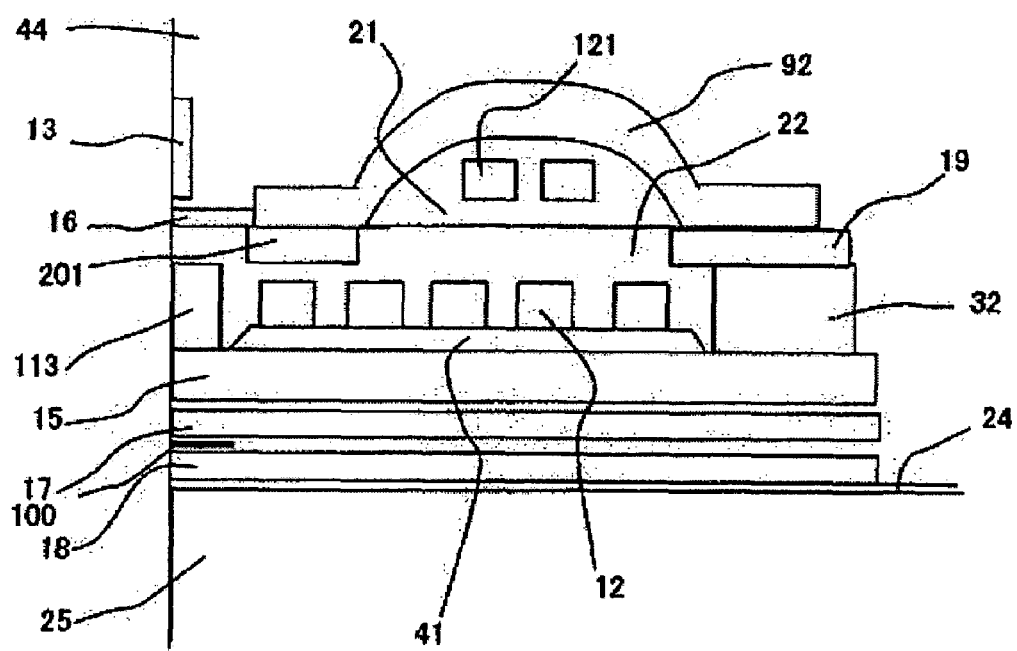
FIG. 10 is a simplified cross sectional view of a magnetic head according to the second embodiment.

FIG. 10 shows a modified example of FIG. 9. This embodiment is applicable also to Embodiment 1. While in all of the embodiments described above the coils are formed into one layer, they may be formed into two layers as shown in FIG. 10, thereby ensuring magnetic fluxes. This constitution is such that after an insulative layer 22 is formed, planarization is applied thereto by CMP or the like, and the second layered coils 121 are surrounded with an insulative layer 121. If a resist material having thermal fluidic property is used for the insulative layer 21, a first magnetic film 92 can be formed in the vicinity of the coils 121.

In this constitution, protrusions formed as a result of inserting the coils 121 are suitably used as they are for the formation of a convex portion of the resist film, and the first soft magnetic film 91 having the curved portion can be formed easily.

Embodiment 3

This embodiment shows a modified example of the curved portion of the first magnetic film 9 in Embodiment 1. As a mechanism for directing the magnetic domains formed in the first magnetic film in parallel with the track width, the curved surface may be left at least on one side of the first soft magnetic film as shown in FIG. 11.

Figure 11:
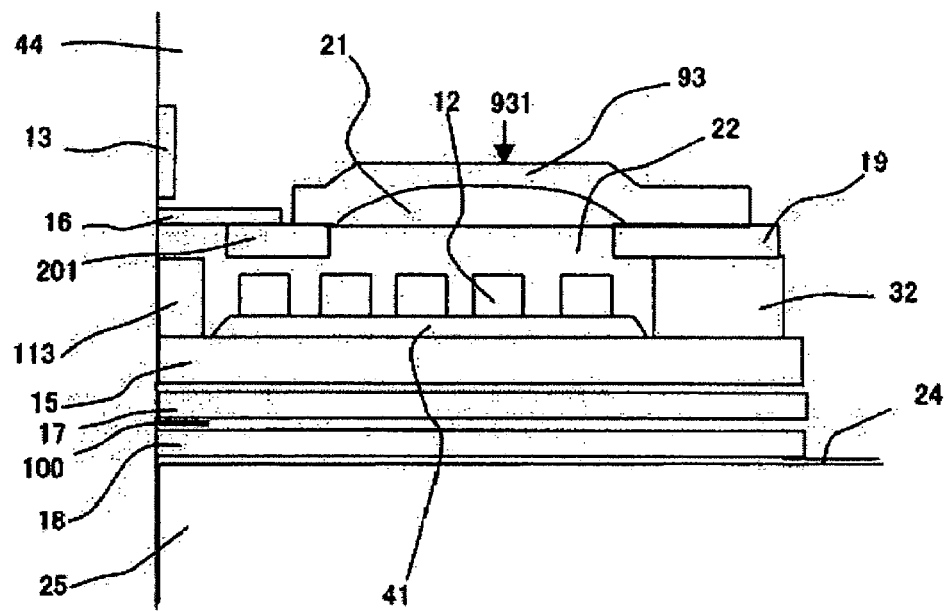
FIG. 11 is a simplified cross sectional view of a magnetic head according to a third embodiment.

In FIG. 11, a curved surface is formed on one side of a soft magnetic film pattern 93 as a first magnetic film and a planar surface 931 is formed on the other (upper) side of the pattern 93. The first magnetic film 93 is in contact with the non-magnetic material 21 and the curvature is provided for the contact surface of the non-magnetic body 21, thereby forming the curved portion on the lower surface of the first magnetic film 93. The non-magnetic body 21 is constituted with a polymeric resin and subjected to a heat treatment.

If a shape of generating magnetic charges at a film surface is artificially prepared in a case where magnetic domains extend along the longitudinal direction, favorable high frequency characteristics can be obtained. Also in this embodiment, magnetic domains in the first soft magnetic film easily tend to direct to the direction of the recording track width. This achieves the recording operation at a high frequency of 600 MHz or higher.

If the first magnetic film is formed by sputtering deposition and by way of a plating method using a frame, the upper surface of the first magnetic film 93 has the same curved portion as that for the lower surface thereof. However, the thermal deformation of the first soft magnetic film can be decreased by applying planarization such as CMP. Further, this results in an advantage that the planarized surface can be utilized easily for the subsequent preparation of a structural body.

Figure 12:
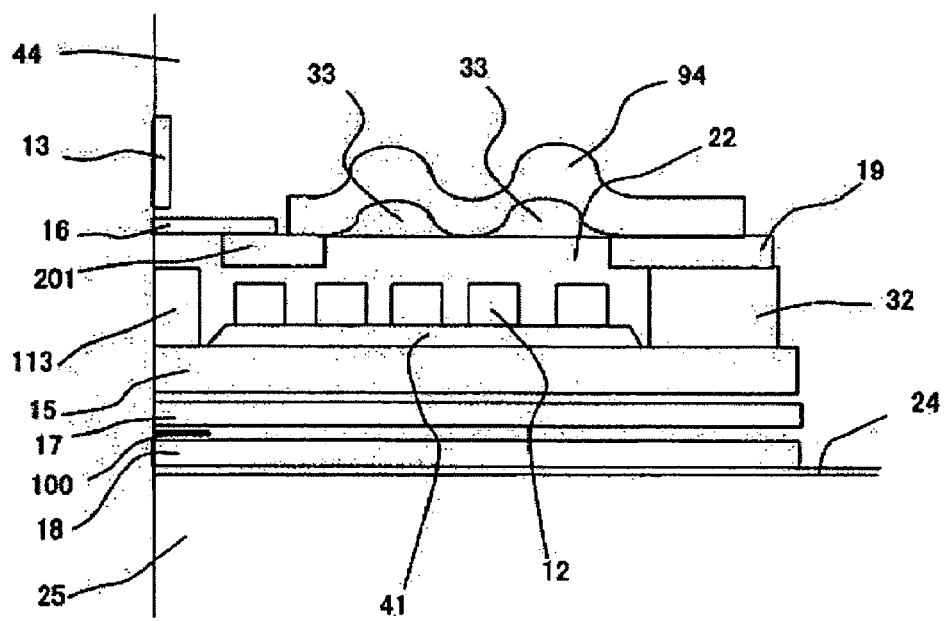
FIG. 12 is a simplified cross sectional view of a magnetic head according to the third embodiment.

In the embodiments described so far, the curvature of the first magnetic film 94 magnetically connected with the main magnetic pole piece that defines the recording track width is disposed at one position but the invention can function effectively also by providing a plurality of curvatures on the first magnetic film 94 as shown in FIG. 12. This constitution is realized by previously disposing an insulative layer 33 having a plurality of protrusions below the first magnetic film 94. It is not necessary that the insulative film 33 is a particularly special material but it can be formed easily by changing the thickness of the resist pattern at positions close to each other and then applying a heat treatment.

Embodiment 4

Figure 13:
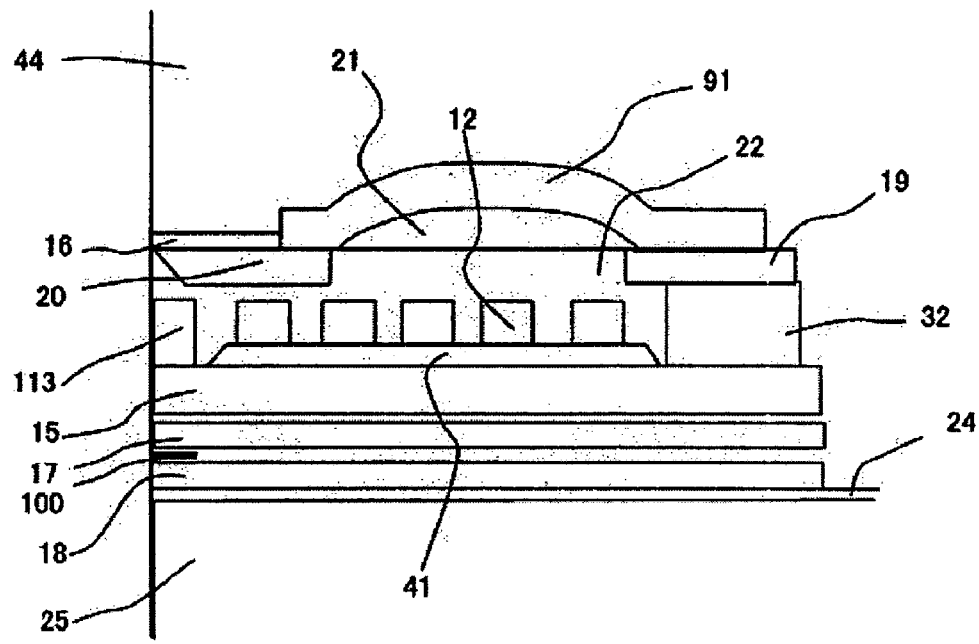
FIG. 13 is a simplified cross sectional view of a magnetic head according to a fourth embodiment.

This embodiment is a further modified example of Embodiment 1. As shown in FIG. 13, the presence of a shield near the main magnetic pole piece is not essential in the invention. Aimed recording operation at high frequency can be attained also with a constitution of saving the shield 13 from the structure shown in FIG. 1, by providing a curvature with the first soft magnetic film 91 which is magnetically connected with a thin and planar main magnetic pole piece 16. Further, the main magnetic pole piece 16 is extended in the direction of the depth such that it is directly connected magnetically with the first magnetic film 91 having the curved portion. This can improve the transmission efficiency of magnetic fluxes to the main magnetic pole piece 15. Since the soft magnetic film as the fourth magnetic film 20 has a tapered structure in which the film thickness increases from the air bearing side to the side in the depth direction, it serves as an auxiliary magnetic pole piece.

Figure 14:
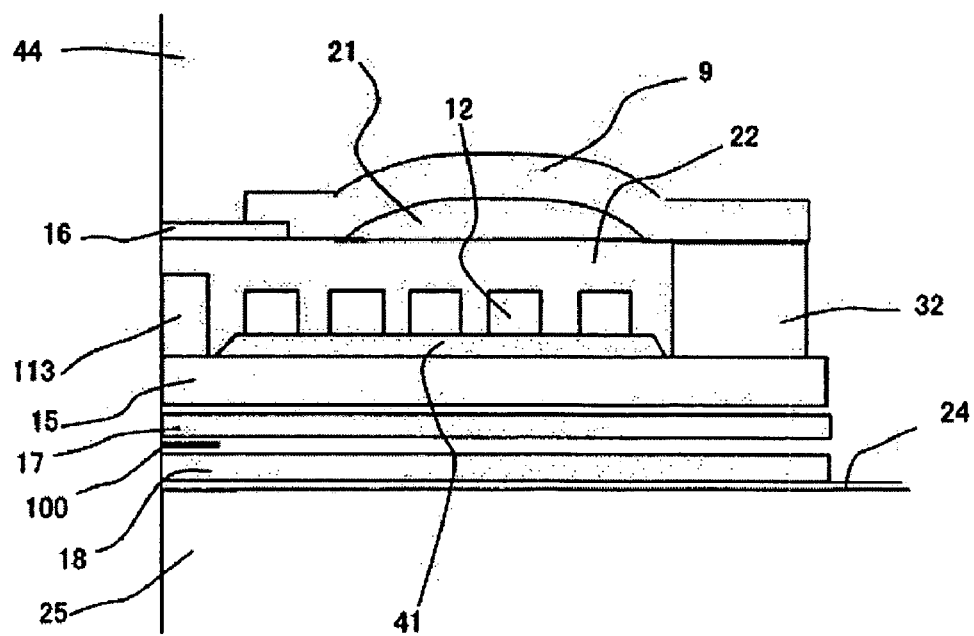
FIG. 14 is a simplified cross sectional view of a magnetic head according to the fourth embodiment.

FIG. 14 shows a modified example in which a fourth magnetic film as a thick magnetic film is not formed below the planarized plane on which the main magnetic pole piece 16 is formed. In addition, the first magnetic film 9 having the curved portion is magnetically connected with the main magnetic pole piece 16 by bring the first magnetic film 9 into direct contact with part of an upper portion of the main magnetic pole piece. The fourth magnetic film can facilitate the fabrication of the main magnetic pole piece 16 that is thin and defines the track width requiring fabrication accuracy. However, the manufacturing steps are simplified by saving the step of forming the fourth magnetic film in this example. Unless a problem in which the top end of the main magnetic pole piece is scraped or the like is caused in the step of forming the first magnetic film, magnetic connection between the first magnetic film 9 and the main magnetic pole piece 16 can be ensured directly, simplifying the manufacturing step.

As a further modified example, although not illustrated, another constitution may be adopted in which the lower surface of the first magnetic film 9 on the side of the air bearing surface (top end) is formed from the upper surface of the main magnetic pole piece. In this case, the first magnetic film 9 having the curved surface is formed on the upper surface of the main magnetic pole piece. The end face of the main magnetic pole piece not on the air bearing surface side is in contact with the insulative film, and the curved surface of the first magnetic film is formed on the upper surface of the insulative film. In this constitution, since the main magnetic pole piece having a reversed trapezoidal cross section is in contact at the upper surface of large area with the first magnetic film, this provides an effect of reducing the magnetic resistance (improved efficiency).

Embodiment 5

Figure 15:
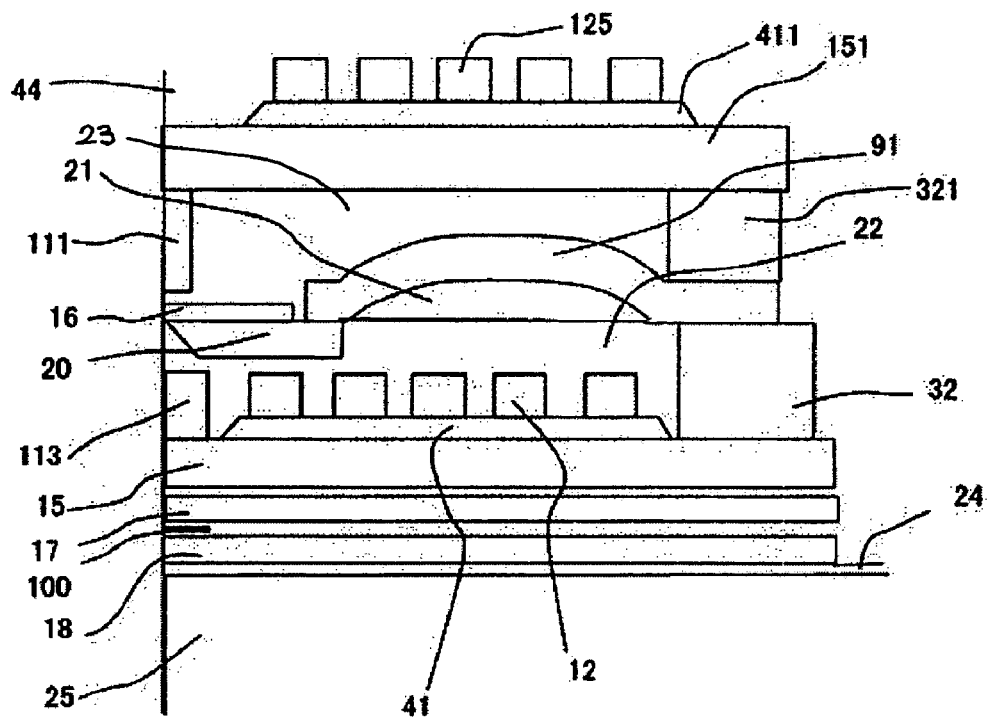
FIG. 15 is a simplified cross sectional view of a magnetic head according to a fifth embodiment.

While all of the embodiments described above are constituted to have the main magnetic pole piece on the flowing-out end (trailing side), there is also a constitution having the main magnetic pole piece 16 at another position. FIG. 15 shows a constitution having soft magnetic film patterns 32115 adapted to receive return magnetic fluxes from the medium at its upper and lower locations. That is, in addition to the existent second soft magnetic film 15, a sixth soft magnetic film 151 is disposed at a position (uppermost portion) for sandwiching the main magnetic pole piece 16 by way of an insulative layer 23. To provide the soft magnetic film 151 with a function of receiving the return magnetic fluxes from the medium, a soft magnetic pattern 321 is disposed at the rear end position so as to magnetically connect the soft magnetic film 151 with the first magnetic film 91 through the pattern.

The sixth soft magnetic film pattern 151 extends in the direction of the air bearing surface, and a second pedestal magnetic pole piece 111 is disposed at a position nearest to the air bearing surface. The function is the same as that of the first pedestal magnetic pole piece 113 disposed at the second magnetic film 15 (decreasing the concentration of magnetic charges at the end).

In the illustrated embodiment, an insulative layer 411 is disposed over the sixth magnetic film pattern 151 and, further, coils 125 are disposed to improve the recording efficiency. However, the constitution only comprising the coils 12 (constitution with no insulative layer 411 and coils 125) may also be conceivable as another simple and convenient constitution.

In any of the constitutions described above, what is important is to provide a curvature to the first magnetic film 91 connected with the main magnetic pole piece 16 and aimed recording operation at a frequency of 600 MHz or higher can be attained by the arrangement.

Figure 16:
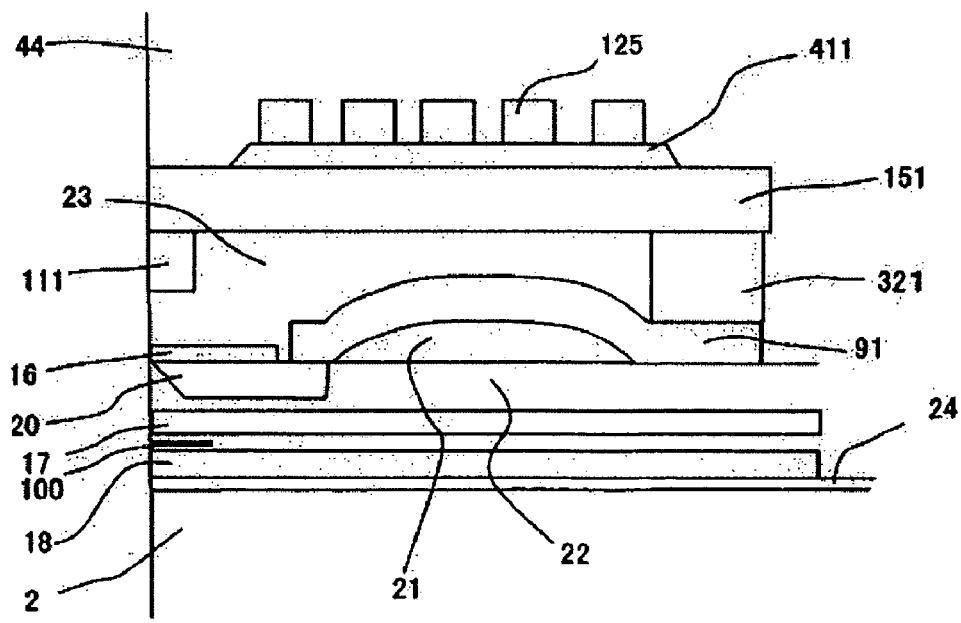
FIG. 16 is a simplified cross sectional view of a magnetic head according to the fifth embodiment.

Further, as shown in FIG. 16, the invention can be applied also to an embodiment in which the main magnetic pole piece 16 is disposed on the side of the reading system. Also in this embodiment, a sixth soft magnetic film pattern 151 is disposed by way of an insulative layer 23 above the main magnetic pole piece 16 (equivalent in the function to the second magnetic film). Then, a pedestal magnetic pole piece 111 is optionally provided on the side of the air bearing surface thereof and a soft magnetic film pattern 321 is disposed at the rear end position thereby intending to magnetic connection with the first magnetic film 91.

Also in the constitutions described above, what is important is to provide a curvature to the first magnetic film 91 connected with the main magnetic pole piece 16 and aimed recording operation at a frequency of 600 MHz or higher can be attained by the arrangement.

In the embodiment of FIG. 16, since the coils 125 are formed over the sixth soft magnetic film pattern 151 by way of the insulative layer 411 (coils are formed finally), it has an advantage of facilitating the formation of the coils.

Figure 17:
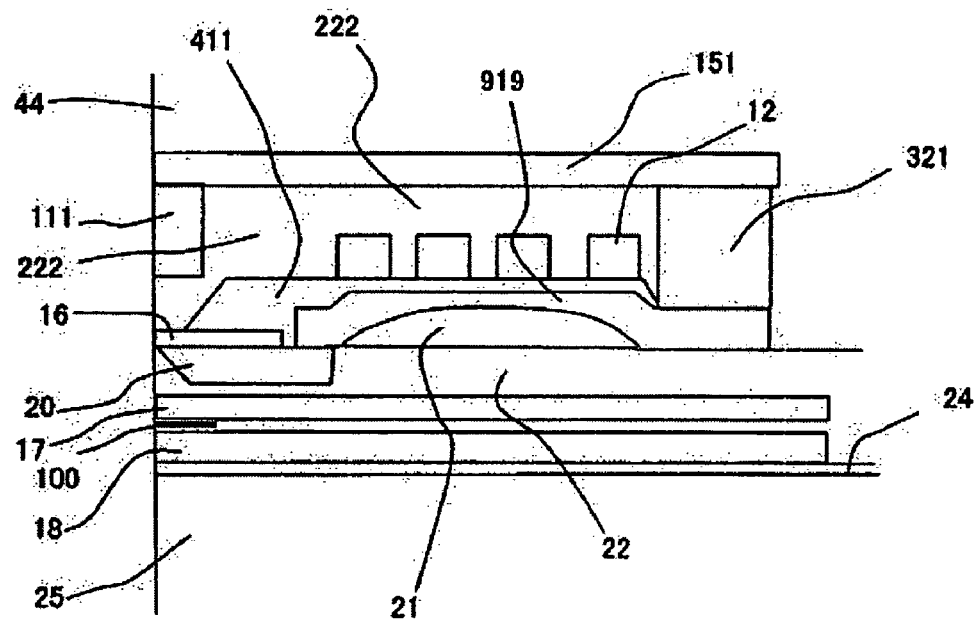
FIG. 17 is a simplified cross sectional view of a magnetic head according to the fifth embodiment.

It is of course possible to dispose the coils between the first magnetic film and the sixth soft magnetic film pattern 151. FIG. 17 shows this constitution. Also in this embodiment, the main magnetic pole piece 16 is disposed at the lower surface and the first soft magnetic film 919 is provided with a curvature. Since coils cannot be formed in a state leaving the curvature, after application of an appropriate planarizing treatment, an insulative layer 411 is stacked, on which the coils 125 are provided. A sixth soft magnetic film pattern 151 for returning magnetic fluxes from the medium is disposed by way of an insulative layer 222, and a soft magnetic film pattern 321 is disposed at the rear end position and connected electrically with a first magnetic film 919.

Also in the constitutions described above, what is important is to provide a curvature to the first magnetic film 919 connected with the main magnetic pole piece 16 and aimed recording operation at a frequency of 600 MHz or higher can be attained by the arrangement.

In each of the constitutions described in FIGS. 16 and 17, the main magnetic pole piece 16 is disposed on the side of the reading device. Then, the soft magnetic film pattern for returning the magnetic fluxes from the medium is disposed on the trailing side. With the constitution described above, since the pedestal magnetic pole piece 111 is also on the trailing side relative to the main magnetic pole piece on the side, of the air bearing surface, of the soft magnetic film, the arrangement for properly allowing magnetic fluxes to leak from the main magnetic pole piece to the pedestal magnetic pole piece can be formed easily. Due to the effect, the gradient of the magnetic fields of the main magnetic pole piece on the side of the trailing can be made sharp. This can provide the function as the shield for making the gradient of the magnetic fields in the magnetic pole piece sharp and the function of decreasing the concentration of the magnetic charges as the essential purpose of the pedestal magnetic pole piece (function of enlarging the area exposed to the air bearing surface) together.

Figure 18:
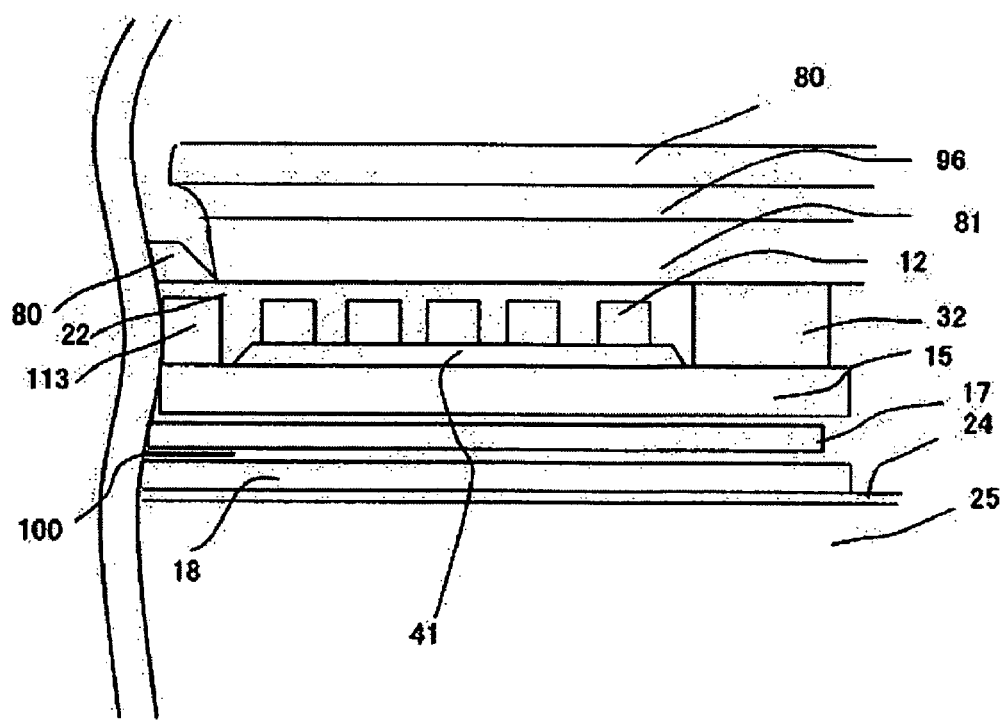
FIG. 18 is a view showing manufacturing steps according to an aspect of the invention.
Figure 19:
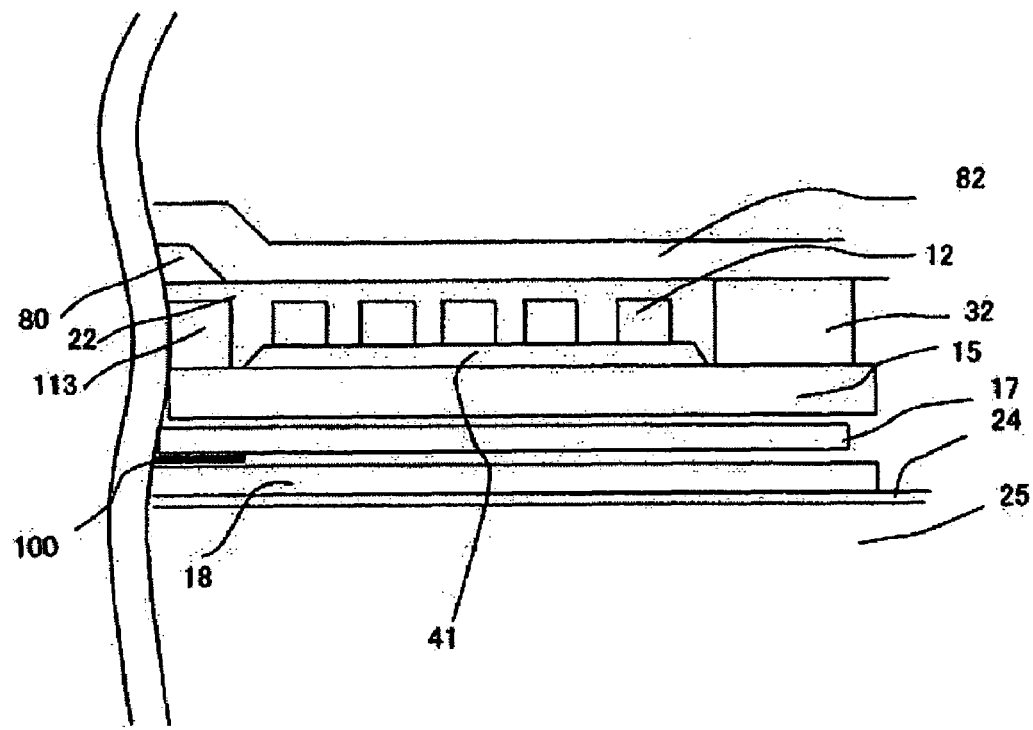
FIG. 19 is a view showing manufacturing steps according to an aspect of the invention.

Then, a method of manufacturing a magnetic head according to the invention is to be described with reference to FIG. 18 for the magnetic head of Embodiment 1 by way of example. At first, a reading portion is formed on a substrate 25 such as of alumina titanium carbon $Al_2O_3$—TiC, etc. The reading portion is formed by successively forming, on the substrate 25, an underlayer 24, a first shield 18, a magnetoresistive element 100, and a second shield 17. After formation of the reading portion, an insulative film is formed, and a writing portion is formed. Manufacturing steps for the writing portion are to be described specifically. A second magnetic film 15 is formed by forming a soft magnetic film by a plating method after forming a resist frame, or by depositing a soft magnetic film by a sputtering method by way of a non-magnetic insulative film on a second shield 17. A coil under film 41 and coils 12 are formed and a pedestal soft magnetic film 113 and a magnetic film 32 at the rear connection end are formed in front of and behind thereof by a plating method or a sputtering method. An insulative film 22 such as of alumina that covers coil conductors is deposited and the surface thereof is planarized by CMP, etc. Resists (first resist (polymeric resin) 81 and a second resist (photosensitive resin) 96) are deposited over the polished plane. The polymeric resin 81 (for example, PMGI resin) formed as a lower layer and the second resist (photosensitive resin) 96 formed thereon are changed in view of the cross sectional area in the direction of the film thickness. The size of a first resist in the direction of the height of the device is made smaller than the size of the second resist in the direction of the height of the device. That is, as viewed in the direction of the depth from the side of the air bearing surface, the resist end is more remote and engraved at a portion near the auxiliary magnetic pole piece 15, to form an overhung shape. This can be formed by depositing the resist 96 formed of the photosensitive resin on the polymeric resin 81 and dipping the same in the liquid developer upon patterning. By selecting the polymeric resin such that the solubility to a predetermined solution is higher than that of the resist, the dissolving rate can be made higher than that of the photosensitive resin and it is dipped further. This is shown in FIG. 18. Further, an insulative film 80 is deposited and subjected to lift-off to form an alumina ($Al_2O_3$) insulative film for attaining a tapered shape at the top end of the fourth magnetic film 20. A mechanism for providing the taper to the insulative film can be obtained by selecting a resist for the insulative film, forming the resist into a predetermined shape and then applying a heat treatment. By use of the lift off, linearity of the slope is improved and the inclination can be moderated. This enables to increase an aligning margin upon exposing a portion of the slope to the air bearing surface. As shown in FIG. 19, a soft magnetic film 82 is deposited subsequently. The formed surface is polished by CMP or the like for planarization.

Figure 20:
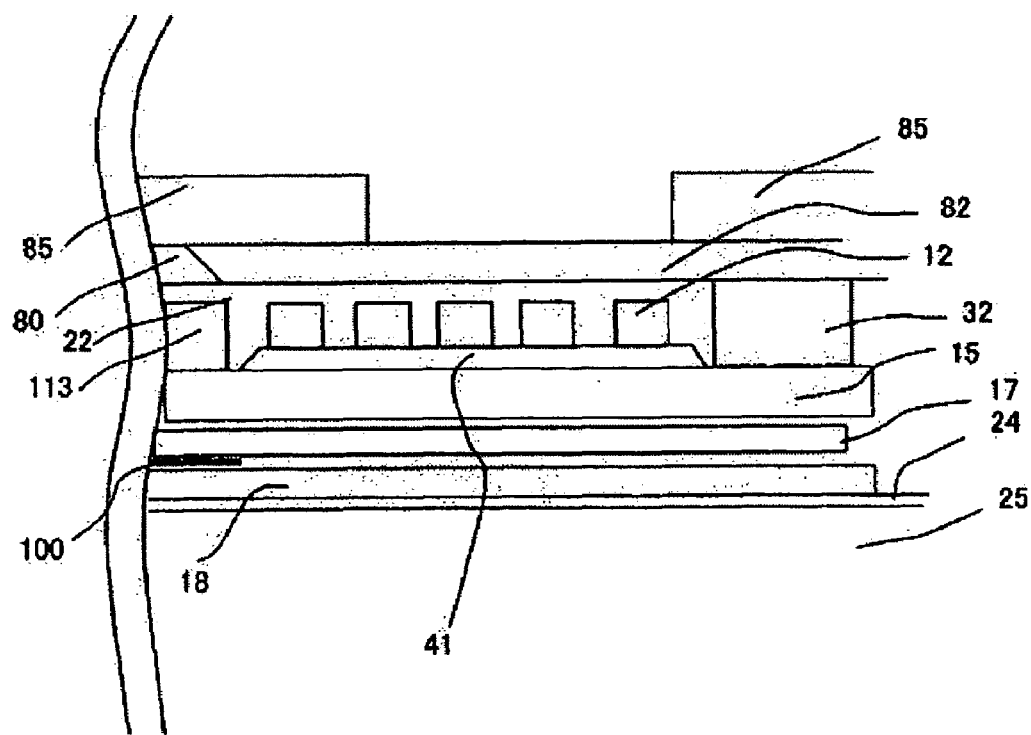
FIG. 20 is a view showing manufacturing steps according to an aspect of the invention.
Figure 21:
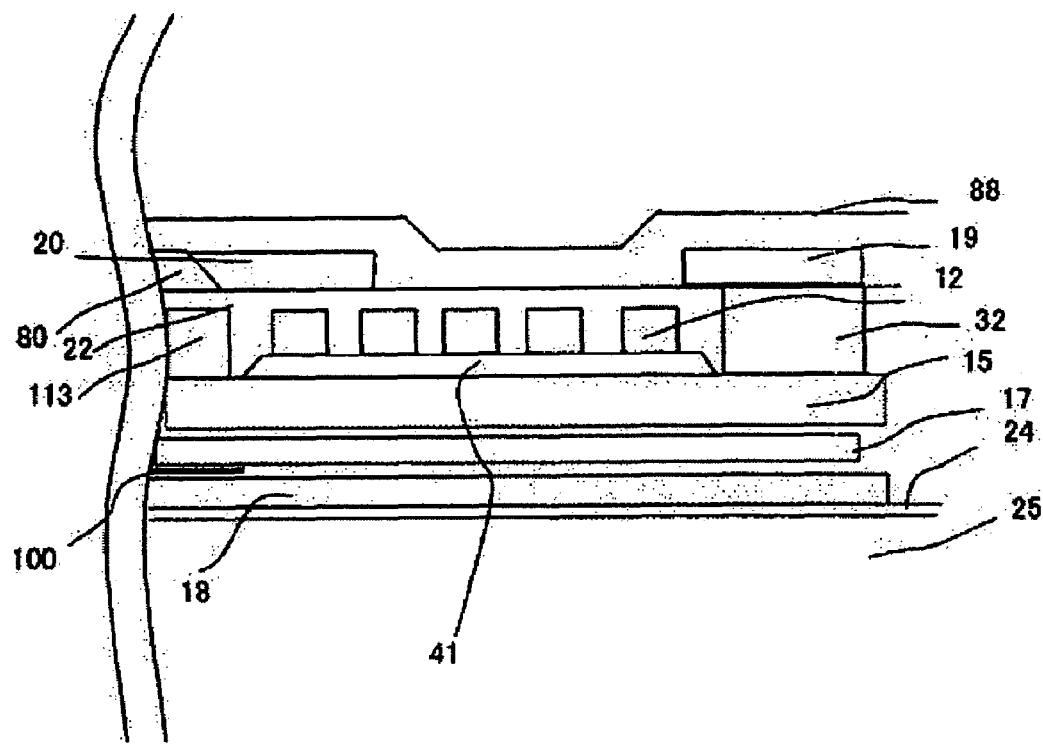
FIG. 21 is a view showing manufacturing steps according to an aspect of the invention.
Figure 22:
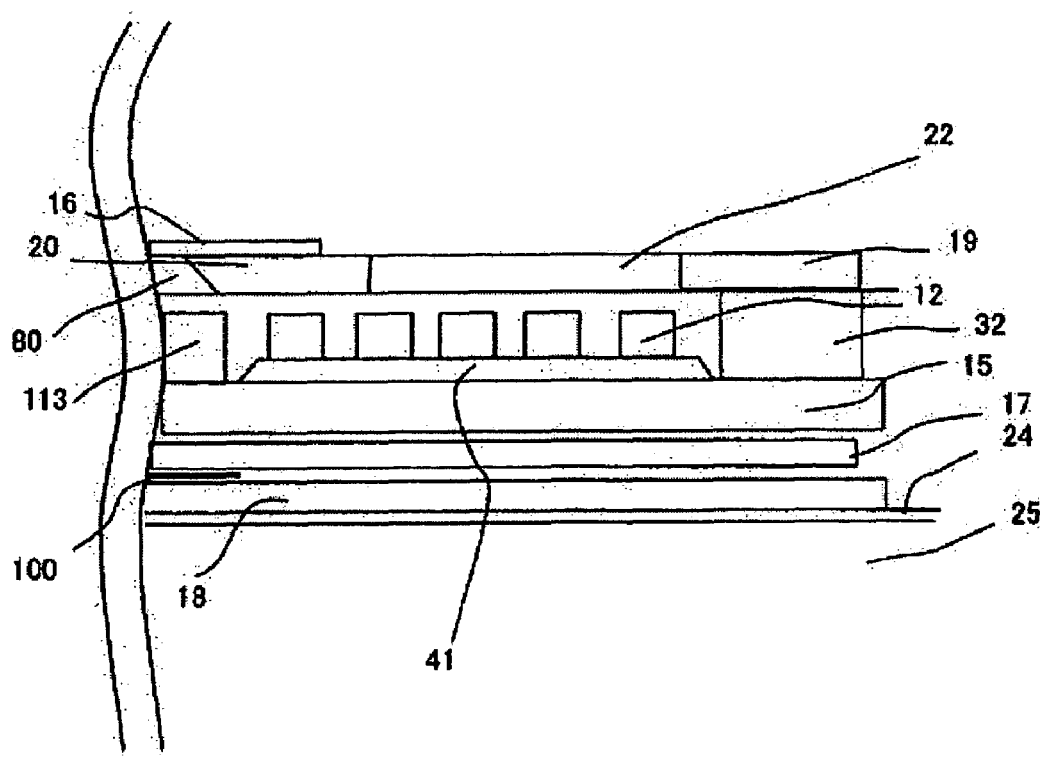
FIG. 22 is a view showing manufacturing steps according to an aspect of the invention.
Figure 23:
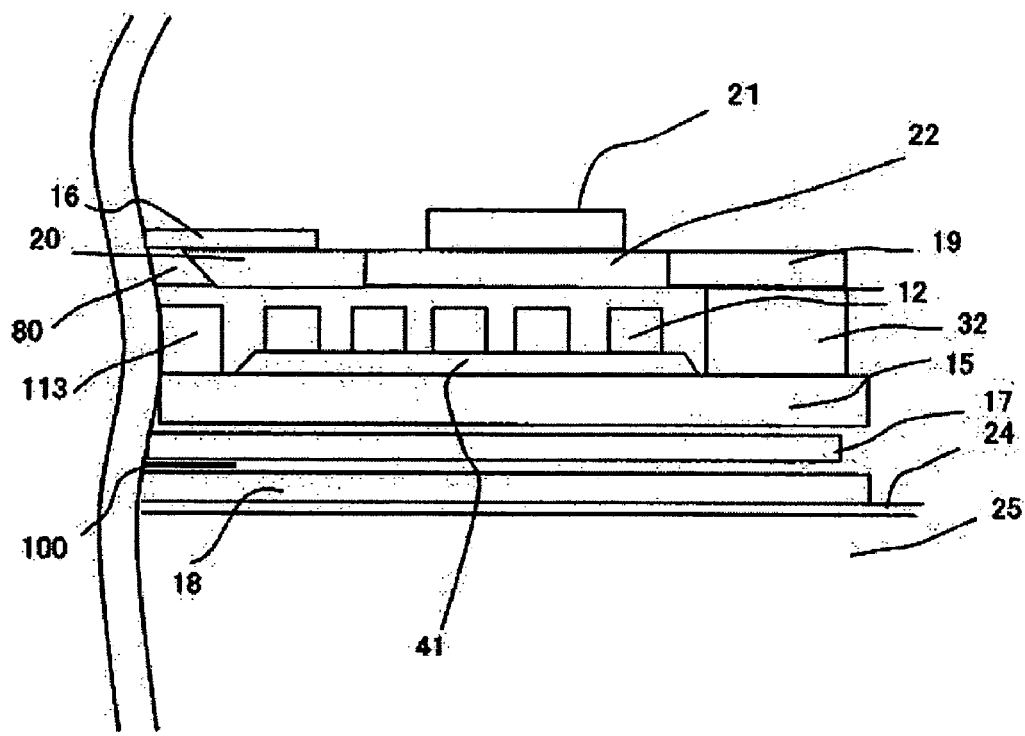
FIG. 23 is a view showing manufacturing steps according to an aspect of the invention.
Figure 24:
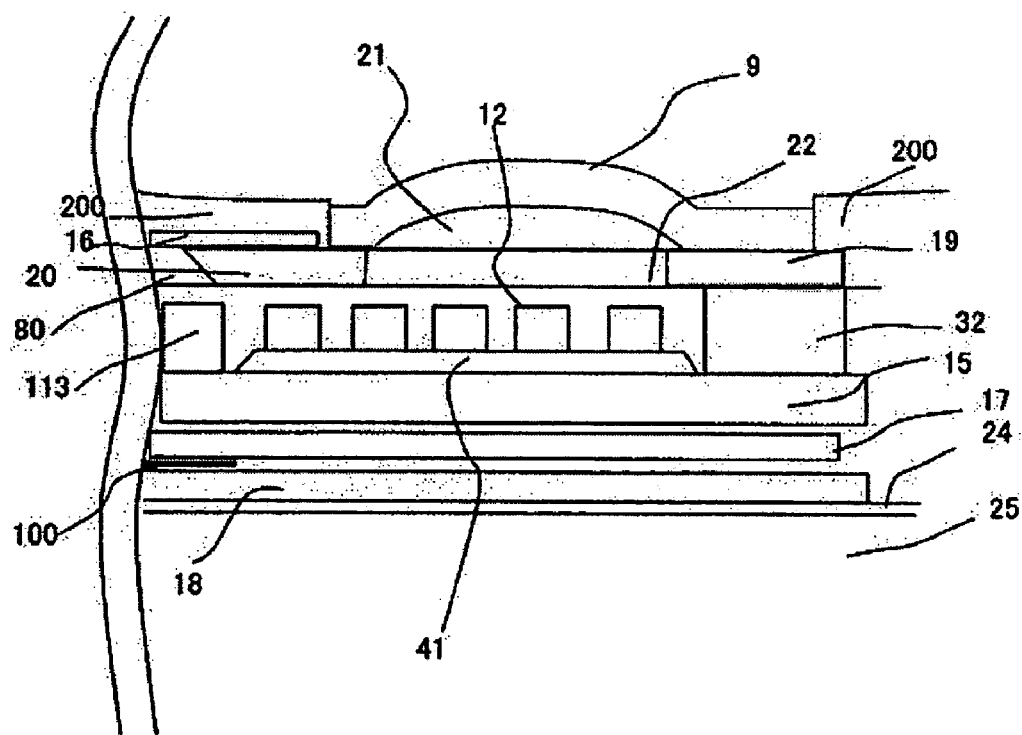
FIG. 24 is a view showing manufacturing steps according to an aspect of the invention.
Figure 25:
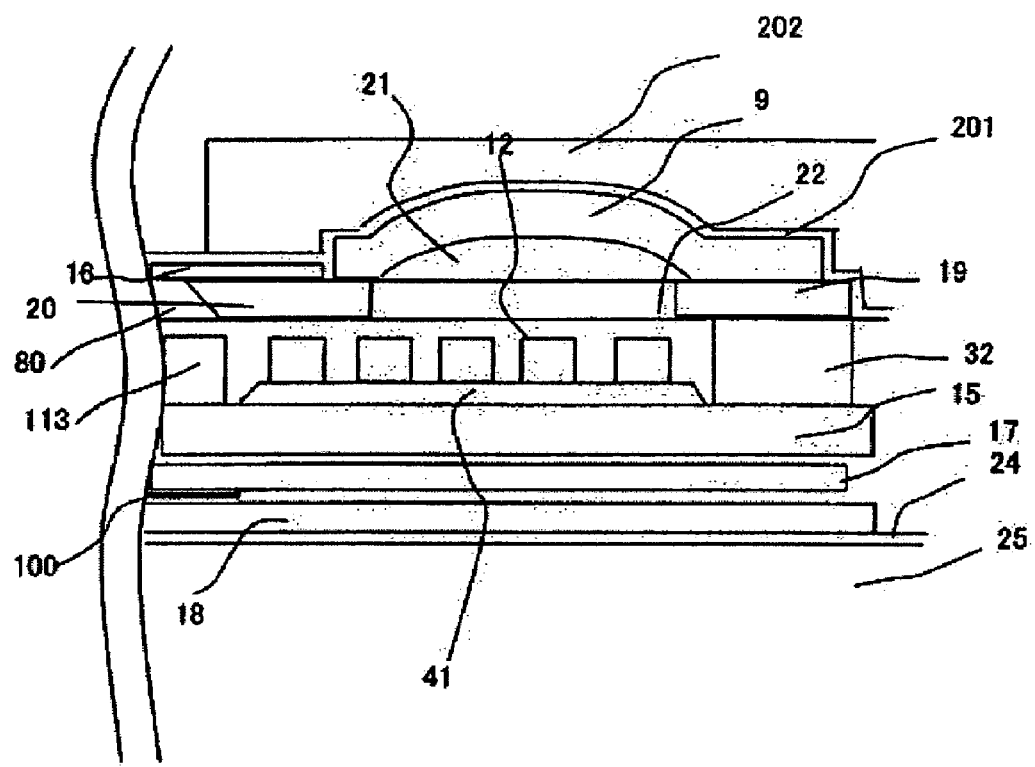
FIG. 25 is a view showing manufacturing steps according to an aspect of the invention.
Figure 26:
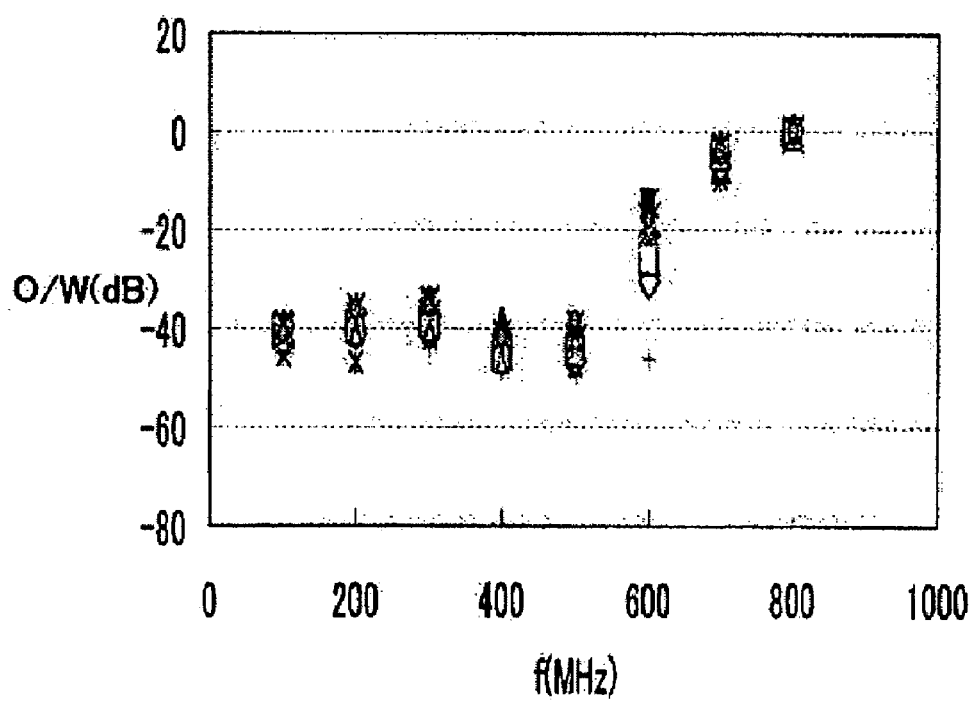
FIG. 26 shows frequency characteristics of a conventional perpendicular magnetic recording head

Then, as shown in FIG. 20, a resist pattern 85 is formed by using a mask. By selective etching, a portion not formed with the resist pattern is etched and a fourth magnetic film 20 and a third magnetic film 19 are formed as shown in FIG. 21. An insulative film 88 such as of alumina is formed over them. Then, by planarizing the same, for example, by CMP, a surface on which the main magnetic pole piece 16 is formed is formed. Then, as shown in FIG. 22, the main magnetic pole piece 16 as the soft magnetic film is formed by a plating method by using a frame. Then, as shown in FIG. 23, a pattern 21 of a polymeric resin such as resist is formed. By applying a heat treatment at a higher temperature than the thermal flow temperature, a non-magnetic insulative film with protrusions is formed. A first magnetic film 9 is formed over the same by a plating method using a frame 200. Then, as shown in FIG. 25, a thin non-magnetic film 201 is formed on the main magnetic pole piece 16 and on the first magnetic film 9. Then, a seed film for plating is stacked and, further, a frame 202 is formed and a trailing shield 13 is formed by a plating method. By covering the protective film 22 thereover, a recording function portion is formed. Then, after fabricating a slider such as by formation of grooves, it is subjected to bar cutting and the air bearing surface is determined by polishing.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic head comprising:
    a main magnetic pole piece;
    an auxiliary magnetic pole piece;
    a first coil conductor disposed between a first surface on which the main magnetic pole piece is formed and a second surface on which the auxiliary magnetic pole piece is formed; and
    a first magnetic film magnetically coupled with the main magnetic pole piece;
    a second magnetic film for magnetically coupling the main magnetic pole piece and the first magnetic film;
    wherein the first magnetic film has a shape in which a lower surface thereof is raised at a central portion thereof; and
    wherein the first surface has been leveled by a flattening procedure
    wherein an upper surface of the second magnetic film is a portion of the first surface;
    wherein the second magnetic film is exposed to an air bearing surface and has a tapered structure in which the film thickness decreases toward the air bearing surface.

2. A magnetic head according to claim 1, wherein:
    a thickness of each of the first and the second magnetic film is larger than the thickness of the main magnetic pole piece;
    the lower surface of the first magnetic film has a region in contact with the first surface and a region in contact with a first insulative film formed over the first surface; and
    the flattening procedure is conducted by chemical-mechanical polishing.

3. A magnetic head according to claim 2, further comprising:
    a third magnetic film magnetically coupling the first magnetic film and the auxiliary magnetic pole piece;
    a fourth magnetic film magnetically coupled with the auxiliary magnetic pole piece and exposed to an air bearing surface;
    a first shield disposed above the main magnetic pole piece and exposed to the air bearing surface; and a second shield, a third shield and a magnetic resistive device provided between the second shield and the third shield;

wherein a maximum thickness of the first insulative film is larger than a thickness of the main magnetic pole piece, and the first shield is formed of a material with a resistivity higher than a resistivity of the second shield.

4. A magnetic head according to claim 3, wherein the first insulative film is formed by applying a heat treatment to a polymeric resin, and a second insulative film covering the first coil conductor is formed of alumina.

* * * * *